US008553598B2

(12) United States Patent
Manssour

(10) Patent No.: US 8,553,598 B2
(45) Date of Patent: Oct. 8, 2013

(54) NETWORK CODING MODE SELECTOR

(75) Inventor: Jawad Manssour, Stockholm (SE)

(73) Assignee: Telefonaktiebolageta LM Ericsson (Publ), Stockholm (SE)

( * ) Notice: Subject to any disclaimer, the term of this patent is extended or adjusted under 35 U.S.C. 154(b) by 506 days.

(21) Appl. No.: 12/768,397

(22) Filed: Apr. 27, 2010

(65) Prior Publication Data

US 2011/0110288 A1 May 12, 2011

Related U.S. Application Data

(60) Provisional application No. 61/259,406, filed on Nov. 9, 2009.

(51) Int. Cl.
*H04B 7/00* (2006.01)

(52) U.S. Cl.
USPC .......................................... 370/310

(58) Field of Classification Search
USPC .......................................... 370/315
See application file for complete search history.

(56) References Cited

U.S. PATENT DOCUMENTS

| 4,404,532 A | 9/1983 | Welti |
| 2006/0092326 A1 | 5/2006 | Tanabe |
| 2006/0269011 A1 | 11/2006 | Stewart |
| 2007/0019752 A1 | 1/2007 | Kim |
| 2007/0259627 A1 | 11/2007 | Sorrells et al. |
| 2008/0117904 A1* | 5/2008 | Radha et al. .................. 370/389 |
| 2008/0279182 A1* | 11/2008 | Hafeez et al. ................. 370/389 |
| 2010/0040156 A1 | 2/2010 | Patel et al. |
| 2010/0046658 A1 | 2/2010 | Yosoku et al. |
| 2010/0225752 A1 | 9/2010 | Bench et al. |
| 2010/0284488 A1 | 11/2010 | Murakami et al. |

FOREIGN PATENT DOCUMENTS

| WO | 2006/071187 A2 | 7/2006 |
| WO | 2007/008123 A1 | 1/2007 |
| WO | 2009/041884 A2 | 4/2009 |
| WO | 2009/126079 A1 | 10/2009 |
| WO | WO 2009/126079 A1 | 10/2009 |

OTHER PUBLICATIONS

Yalin Evren et al. (IEEE, On the Delay and Throughput of Digital and Analog Network Coding for wireless Broadcast, Mar. 19-21, 2008, pp. 534-539).*
Cristoff Martin et al. (IEEE, Statistical Analysis and Optimal Design for efficient Mobile satellite Broadcast with diversity, Mar. 2008, pp. 986-1000).*
R. Ahlswede, N. Cai, S.-Y.R. Li, and R.W. Yeung. Network information flow, IEEE Trans. Info. Theory, Jul. 2000.
U.S. Patent Application of Manssour, U.S. Appl. No. 12/768,357, filed Apr. 27, 2010, Title: Multi-Domain Network Coding.
Office Action issued in U.S. Appl. No. 12/768,357 dated Jun. 8, 2012.
Popovski, P., et al., "Bi-directional Amplification of Throughput in a Wireless Multi-Hop Network," IEEE 63$^{rd}$ VTC, May 2006.

* cited by examiner

*Primary Examiner* — Mark Rinehart
*Assistant Examiner* — Maharishi Khirodhar
(74) *Attorney, Agent, or Firm* — Nixon & Vanderhye, P.C.

(57) ABSTRACT

A method of operating a wireless communication system comprises making a determination which of plural transmission modes is to be a selected transmission mode for transmitting plural entities to a receiving node over a radio interface, and then (at a network coding node (24)) in accordance with the determination implementing the selected transmission mode with respect to the plural input entities. The plural transmission modes include at least two of: (1) an analog network-coded mode wherein plural input signals provided to a network coding node are network-combined by signal interference at a signal level at the network coding node into one analog network-combined output entity; (2) a digital network-coded mode wherein the plural input entities provided to the network coding node are network-combined by operation at a bit level at the network coding node into one or plural digital network-combined output entities; (3) a symbol level network-coded mode wherein the plural input entities are already modulated and network coding is performed on the already modulated plural input entities; and (4) a separate transmission mode wherein the plural input entities provided to the network coding node leave the network coding node as respective plural uncombined output entities.

27 Claims, 14 Drawing Sheets

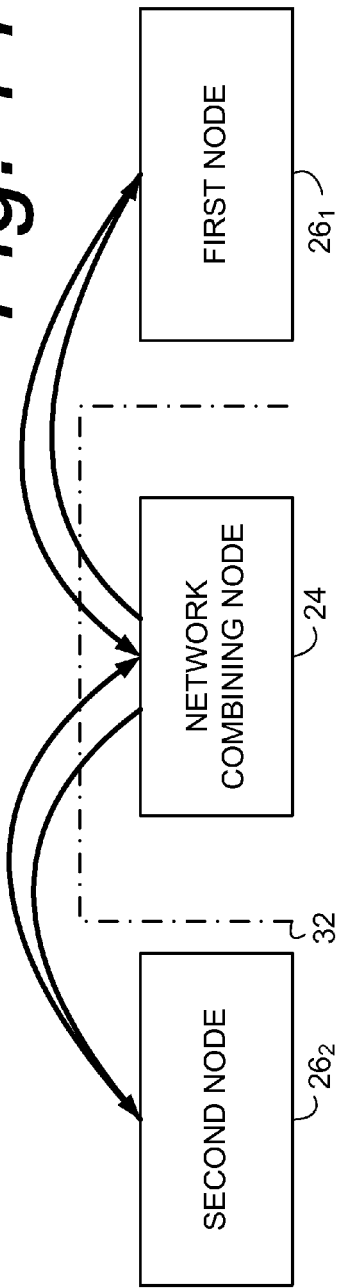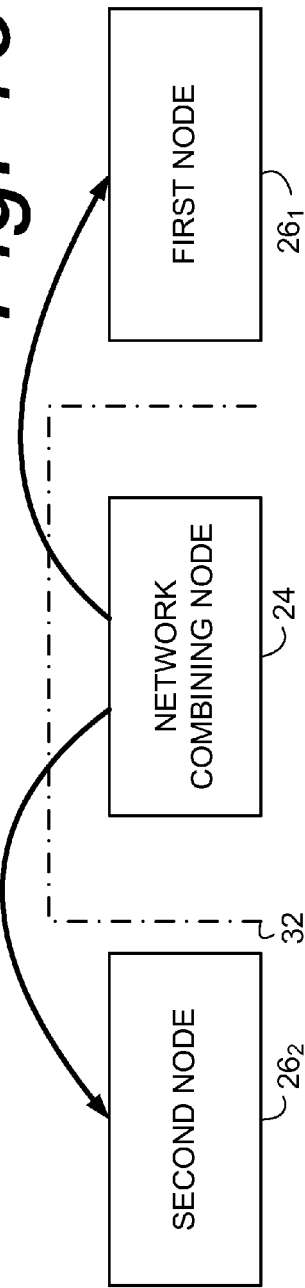

NETWORK CODING MODE SELECTOR

This application claims the priority and benefit of U.S. Patent Application 61/259,406, filed Nov. 9, 2009, entitled "Network Coding Mode Selector", which is incorporated herein by reference in its entirety.

BACKGROUND

This technology pertains in wireless communications networks, and in particular, to wireless communications networks employing network coding.

A communication system transmits information from an information source to a destination over a communication channel. In wireless communication systems, noise and fading lead to the unreliability of the transmission. One way to overcome this unreliability is through the use of intermediate nodes or relay nodes that help the source to transmit its information to the intended destination. Communication systems using relaying operate under a fundamental principle: the information sent from one source, O1, to a destination, D, is transported independently from other information sent from another source, O2, to the same destination, D. Routers, repeaters, or relays forward the data to the destination.

Network Coding (NC) is a new area of networking in which data is manipulated inside the network to improve throughput, delay, and/or robustness. In particular, network coding allows nodes to combine several input packets into one or several output packets. At intermediate nodes, some (linear) coding may be performed on the available packets, and the resulting encoded packet can be broadcasted to different recipients simultaneously instead of transmitting each packet separately.

The area of network coding was first introduced by R. Ahlswede, N. Cai, S.-Y. R. Li, and R. W. Yeung; Network information flow; IEEE Trans. Info. Theory; July 2000, incorporated herein by reference in its entirety. Ahlswede et al present network coding as a method that allows intermediate nodes (e.g., relays) to perform some processing (coding) on the packets they receive in exchange for throughput gain.

In wireless communications, network coding is generally divided into two generic schemes: analog and digital. Analog network coding refers to coding at the signal level. The analog signals add up in the air at the node performing the network coding operation through simultaneous transmissions, i.e., by letting two signals interfere with each other intentionally. Digital network coding refers to coding at the bit level (whether coded or uncoded bits) where the node performing the network coding operation will exclusive OR [XOR] (or alternatively perform other types of encoding on) the bits of the packets to be encoded. By stating herein that digital network-coding (DNC) operates at the bit level includes bit level operations (whether coded or uncoded bits (e.g. FEC) and/or before/after puncturing or rate matching) encompasses operations such as operations on bits (e.g., prior to any channel coding), coded bits, or codewords (e.g., after channel coding), or even modulated symbols.

A network-coded signal may be transmitted to several intended recipients. Consequently, the transmitter needs to make sure that all intended recipients can correctly receive the network-coded signal. This means that the transmission is constrained by the link from the transmitter (i.e., the node transmitting the network-coded signal) to the weakest receiver. This can adversely affect the system performance. Possible approaches try to alleviate this shortcoming include using power control or choosing which users should be grouped together to perform the network coding operation. See, for example, WO2009/126079, published 2009 Oct. 15 and entitled User Grouping Strategies for Network Coding, incorporated herein by reference. Most approaches focus on applying network coding whenever the possibility arises and do not distinguish between which type of network coding should be used, or even whether network coding should be used at all. Another factor that affects system performance is the type of network coding used (i.e., analog or digital).

The technology described herein relates to a method and apparatus for communicating information between two or more network nodes so as to adaptively select a suitable transmission mode based on at least one variable transmission parameter.

SUMMARY

In one of its aspects the technology disclosed herein concerns a method of operating a wireless communication system. The method comprises making a determination which of plural transmission modes is to be a selected transmission mode for transmitting plural entities to a receiving node over a radio interface, and then (at the network coding node) in accordance with the determination implementing the selected transmission mode with respect to the plural entities. The plural transmission modes include at least two of the following: (1) an analog network-coded mode wherein plural input entities provided to a network coding node are network-combined by signal interference at a signal level at the network coding node into one analog network-combined output entity; (2) a digital network-coded mode wherein the plural input entities provided to the network coding node are network-combined (e.g., by a logical or otherwise reversible operation) at a bit level (whether coded or uncoded bits) at network coding node into one or plural digital network-combined output entities; (3) a symbol level network-coded mode wherein the plural input entities (e.g., symbols) are already modulated and network coding is performed on the already modulated plural input entities to provide one or plural symbol-level network-combined output entities; and (4) a separate transmission mode wherein the plural input entities provided to the network coding node leave the network coding node as respective plural uncombined output entities.

In an example embodiment, the method further comprises making the determination on a basis of a performance metric. In an example implementation, the method further comprises adaptively making the determination as the performance metric changes (e.g., changes over time, frequency, or space). In an example implementation, the determination is dependent upon evaluation of a gain function that compares performance of the plural transmission modes. In an example implementation, the gain function is dependent upon a channel quality measure (CQM) such as, for example, a signal to noise and interference ratio (SINR). In an example implementation, the determination can also be dependent upon a quality of service metric.

In some example embodiments, the transmission mode determination involves evaluating expressions for sum achievable rate (R). Which expression to use for each competing candidate transmit mode can depend on such factors as type/extent of analysis to be utilized (e.g., end-to-end (E2E) analysis or non-end-to-end (non-E2E) analysis), whether there is backlog traffic, and whether channel(s) are slow or fast fading.

In one example embodiment, the method comprises making the determination at the network coding node. In another example embodiment the method comprises making the transmission mode determination at the transmitting node. In yet another example embodiment the method comprises making the transmission mode determination at a node or service point which is distinct from the transmitting node and the network coding node. In yet another example embodiment the method comprises making the transmission mode determination at one or more receiving nodes.

In an example embodiment, the method comprises sending an indication of the selected transmission mode to another node (e.g., a transmitting node which transmitted at least one of the plural input entities to the network coding node, a receiving node which receives the one or more output entities from the network coding node).

In another of its aspects the technology disclosed herein concerns a wireless communication system comprising a first node; a second node; a network coding node; and a mode determination unit. The first node is configured to generate a first input entity and the second node is configured to generate a second node input entity. The mode determination unit is configured to make a determination which of plural transmission modes is to be a selected transmission mode for transmitting output entities from the network coding node over the radio interface. In the case of the analog network coding (ANC) mode, or when an end-to-end (E2E) analysis (described subsequently) is conducted, the transmission mode determination of the mode determination unit must be made before first node and the second node transmit their input entities toward the network coding node. The network coding node is configured to receive over a radio interface plural input entities including the first node input entity and the second node input entity. The plural transmission modes include at least two of the separate transmission mode and the aforementioned network-coded modes The mode determination unit is configured to implement the transmission mode determination. The mode determination unit can be located in any suitable node or service point, three alternative example locations being at the network coding node; at the transmitting node; at a network node or service point other than the transmitting node and the network coding node; and, at one or more receiving nodes.

In another of its aspects the technology disclosed herein concerns a mode determination unit configured to make a determination which of plural transmission modes is to be a selected transmission mode for transmitting one or more output entities from a network coding node to a receiving node over a radio interface. The plural transmission modes include the aforementioned network-coded modes and the separate transmission mode.

In another of its aspects the technology disclosed herein concerns a network coding node of a wireless communication system. The network coding node receives plural input entities over a radio interface from one or more transmitting nodes and is configured to make and implement a determination which of plural transmission modes is to be a selected transmission mode for transmitting entities to a receiving node over the radio interface. The plural transmission modes include at least two of the following: (1) an analog network-coded mode wherein plural input entities provided to a network coding node are network-combined by signal interference at a signal level at the network coding node into one analog network-combined output entities; (2) a digital network-coded mode wherein the plural input entities provided to the network coding node are network-combined (e.g., by a logical or otherwise reversible encoding operation) at a bit level (whether coded or uncoded bits) at network coding node into one or plural digital network-combined output entities; (3) a symbol level network-coded mode wherein the plural input entities are already modulated entities (e.g. symbols) and network coding is performed on the already modulated plural input entities; and (4) a separate transmission mode wherein the plural input entities provided to the network coding node leave the network coding node as respective plural uncombined output entities.

In an example embodiment, the network coding node comprises a receiver configured to receive the plural input entities over the radio interface from the transmitting node; a mode determination unit configured to make the determination; a network coding unit configured to implement the selected transmission mode in accordance with the determination with respect to the plural input entities; and, a transmitter configured to transmit the plural output entities either as one or plural network-combined output entities in the network-coded modes or as plural uncombined output entities in the separate transmission mode.

In an example embodiment, the mode determination unit is configured to make the determination on a basis of a performance metric. In an example implementation, the mode determination unit is configured to adaptively make the determination as the performance metric changes (e.g., changes over time, frequency, or space). In an example implementation, the determination is dependent upon evaluation of a gain function that compares performance of the plural transmission modes. The gain function can be dependent upon a channel quality measure (CQM), such as a signal to noise and interference ratio (SINR), for example.

In some example embodiments, the mode determination unit evaluates expressions for sum achievable rate (R). Which expression to use for each competing candidate transmit mode can depend on such factors as type/extent of analysis to be utilized (e.g., end-to-end (E2E) analysis or non-end-to-end (non-E2E) analysis), whether there is backlog traffic, and whether channel(s) are slow or fast fading.

In an example embodiment, the mode determination unit is configured to make the determination dependent upon a quality of service metric.

In example embodiments, the network coding node is configured to make the determination dependent upon input regarding a link from a source node to the network coding node, dependent upon input regarding a link from a source node to an ultimate destination node, and/or dependent upon input regarding a link from the network coding node to an ultimate destination node.

In an example embodiment the network coding node further comprises a transmitter configured to send an indication of the selected transmission mode to another node (e.g., a transmitting node which transmitted at least one of the plural input entities to the network coding node, a receiving node which receives the one or more output entities from the network coding node).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 14 is a diagrammatic view of portions of an example communication system for illustrating a transmission mode determination which is dependent upon an end-to-end (E2E) analysis.

FIG. 15 is a diagrammatic view of portions of an example communication system for illustrating a transmission mode determination which is dependent upon a non-end-to-end (non-E2E) analysis.

DETAILED DESCRIPTION

Figure 1:
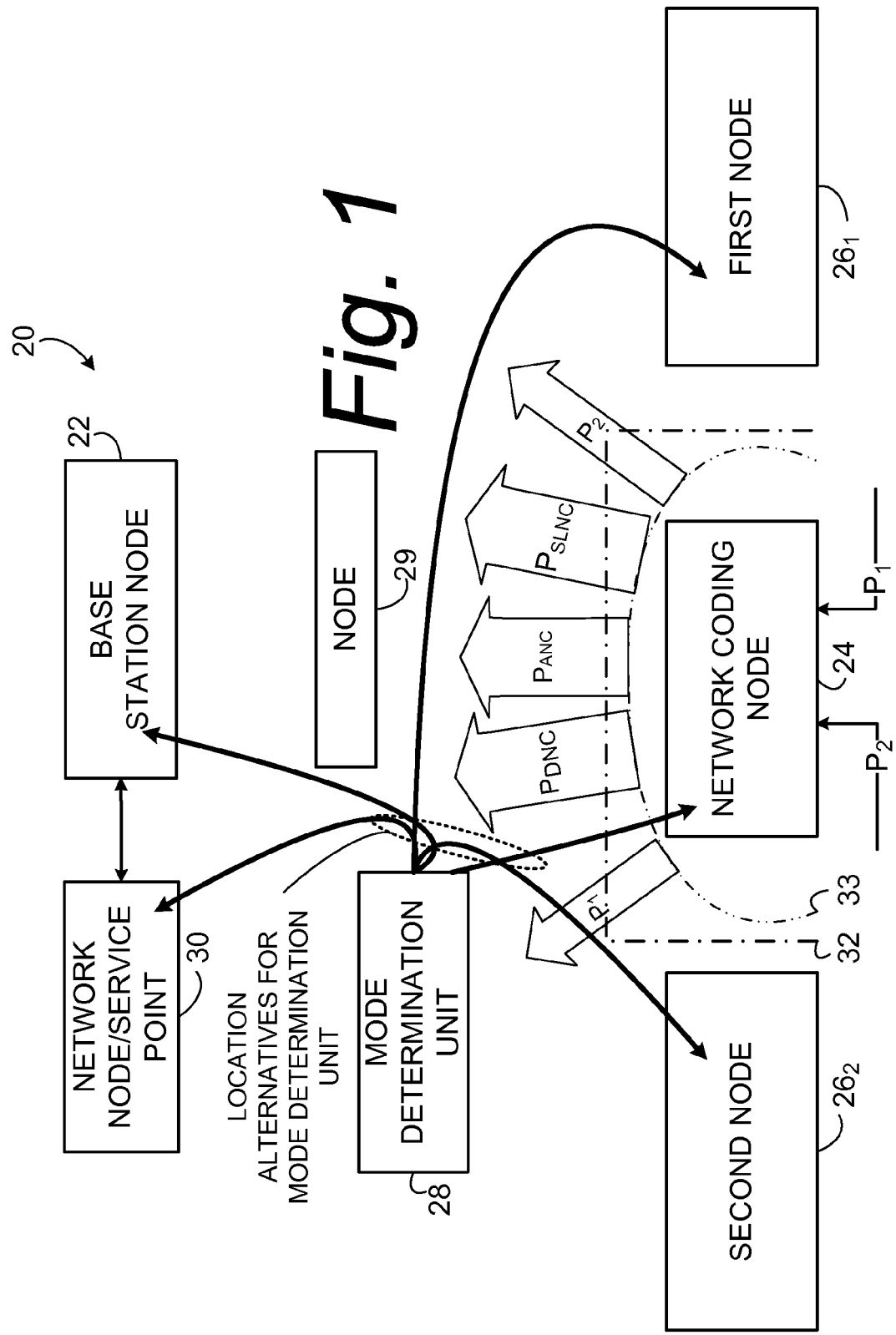
FIG. 1 is a schematic view of an example communication system which facilitates performance of a transmission mode determination and which further illustrates multiple alternative possible locations of a mode determination unit.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

In the technology disclosed herein, the term "entity" is used to denote a packet, signal, or unit of data (with or without header information, before or after modulation, coding, puncturing, rate (de)matching depending on the stage where this data is being processed) that is or can be transmitted between nodes or elements of a communications system. At various junctures herein, an entity which is described as entering or as being applied to a node (e.g., a network coding node) is referred to as an "input entity"; an entity which is described as leaving or as being transmitted from a node (e.g., a network coding node) is referred to as an "output entity". The terms "network-combined" and "network-coded" are used interchangeably herein. The terms "relaying node" and "network coding node" may also be used interchangeably herein.

Studies on network coding reveal that no single network coding mode (i.e., digital or analog) always outperforms the other. For instance, Popovski et al. [P. Popovski and H. Yomo, Bi-directional amplification of throughput in a wireless multi-hop network, IEEE 63rd VTC, May 2006] include simulation results that compare the performance of analog and digital network coding and show that for low to moderate operating signal to interference and noise ratios (SINRs), digital network coding outperforms its analog counterpart (see, e.g., Popovski et al). But it can also be shown that using network coding does not always provide gains as opposed to not using network coding and instead separately transmitting the signals that were intended to be network-coded together.

For instance, consider a scenario where a node N would like to transmit entities (e.g., packets) A and B to users U1 and U2, respectively. U1 already has entity B and U2 already has entity A, so it is possible for node N to network-encode A and B into a resultant entity C=A⊕B and transmit it to both U1 and U2 instead of using two transmissions to separately send entity A to U1 and entity B to U2. If we denote the SINR from N to U1 as Γ1, and the SINR from N to U2 as Γ2, then the sum-capacity of using network coding (CNC) as opposed to separately transmitting the two entities (Cdir) are respectively given by Expression 1 and Expression 2.

$$CNC=\log_2(1+\min\{\Gamma 1, \Gamma 2\})+\log_2(1+\min\{\Gamma 1, \Gamma 2\}) \quad \text{Expression (1):}$$

$$Cdir=\tfrac{1}{2}\log_2(1+\Gamma 1)+\tfrac{1}{2}\log_2(1+\Gamma 2) \quad \text{Expression (2):}$$

The min operator for CNC in Expression (1) means that N is constrained by the weakest link between Γ1 and Γ2. A main advantage of using the network coding operation is that both entities can be transmitted at once as opposed to the separate transmission otherwise, yielding the ½ factor (since there are two transmissions) for the case of Cdir. Looking at a numerical example, assume that Γ1=20 dB=100 and Γ2=0 dB=1, then we have the respective expressions (3) and (4).

$$CNC=\log_2(1+1)+\log_2(1+1)=2[b/s/Hz] \quad \text{Expression (3):}$$

$$Cdir=\tfrac{1}{2}\log_2(1+1)+\tfrac{1}{2}\log_2(1+100)=3.83\ [b/s/Hz] \quad \text{Expression (4):}$$

The technology proposed herein examines which transmission mode is more suitable to be used by taking as input, for example, a channel quality measure (CQM) from the source nodes to the node performing the network coding operation and/or the channel quality measure (CQM) from the source nodes to the ultimate destination(s) and/or the channel quality measure (CQM) from the node performing the network coding operation to the ultimate destination(s). Other input parameters can include Quality of Service (QoS) metrics like bit error rate (BER), delay, etc. The transmission mode is selected after computing a certain gain function based on, e.g., computing the sum-capacity of the transmission.

FIG. 1 shows an example wireless communication system 20 comprising base station node 22; network coding node 24; plural nodes including first node $26_1$ and second node $26_2$; and mode determination unit 28. Optionally, wireless communication system 20 includes further nodes such as node 29 and (in either a core network or a radio access network) a network node or service point, represented as network node/service point 30 in FIG. 1. In a variation of FIG. 1, the transmitting node 22 and network coding node 24 can be the same node.

Figure 2:
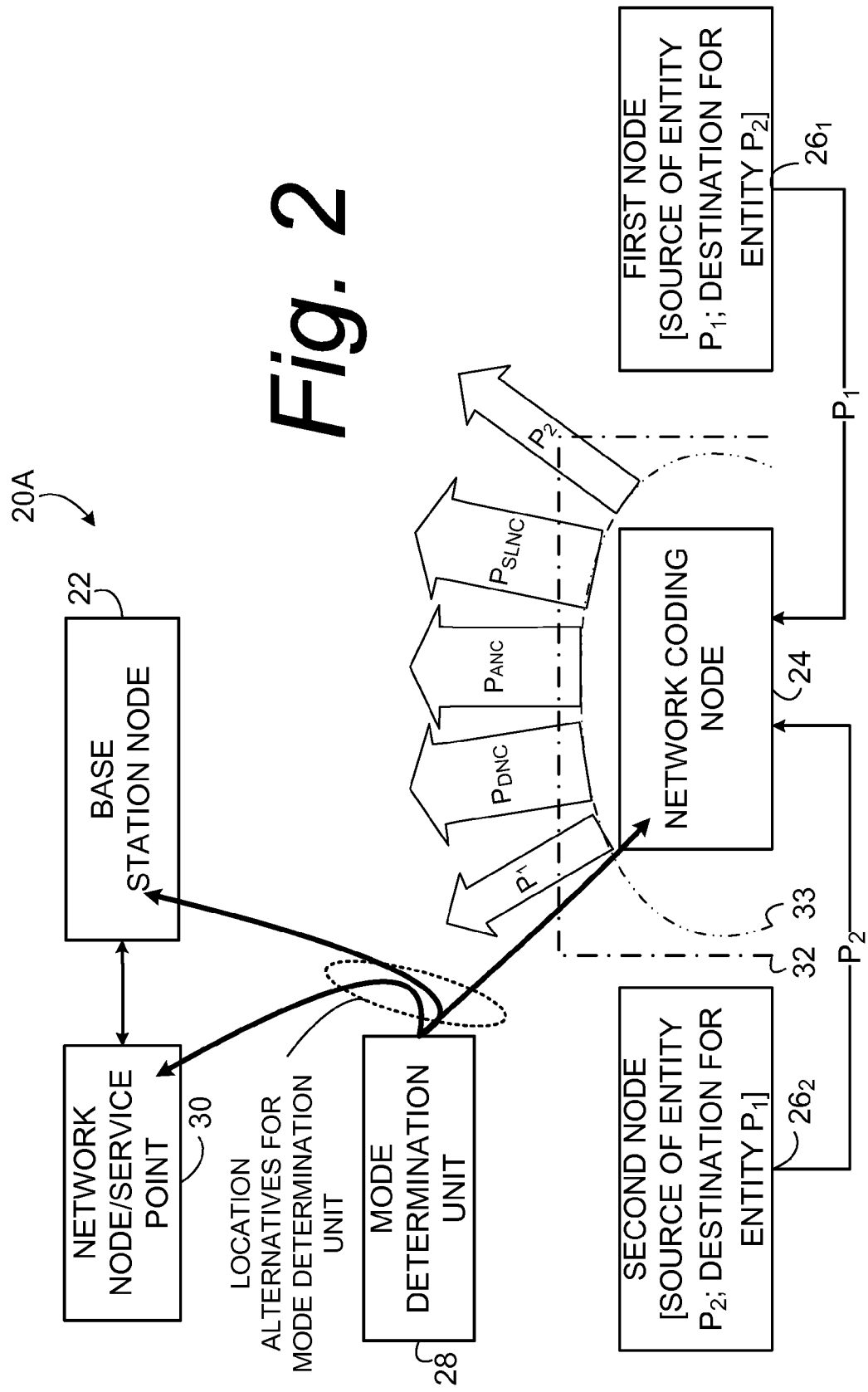
FIG. 2 is a schematic view of an example communication system having a bidirectional relay topology.

FIG. 2 illustrates an example topology of wireless communication system 20A in which bidirectional network coding can be performed. In the particular example wireless communication system 20A illustrated in FIG. 2, first node $26_1$ serves as an originating or source node for first node entity $P_1$ and second node $26_2$ serves as an originating or source node for second node entity P2. Both entity $P_1$ and entity $P_2$ are transmitted over air or radio interface 32 and are received as plural input entities provided to network coding node 24. Typically there are many other nodes which are served by or use network coding node 24 and/or transmitting node 22, but for sake of clarity only two such nodes are illustrated. It so happens in the example wireless communication system 20A of FIG. 2 that first node $26_1$ also serves as the destination node for entity $P_2$ and second node $26_2$ also serves as the destination node for entity $P_1$. In the FIG. 2 topology, first node $26_1$ with data d1 and second node $26_2$ with data d2 want to exchange their data through network coding node 24 (e.g., first node $26_1$ and second node $26_2$ may not be able to directly communicate with each other and in such case need to do so through network coding node 24). Thus, in the particular situation shown in FIG. 2, network coding node 24 essentially serves as an intermediate node between first node $26_1$ and second node $26_2$.

Figure 3:
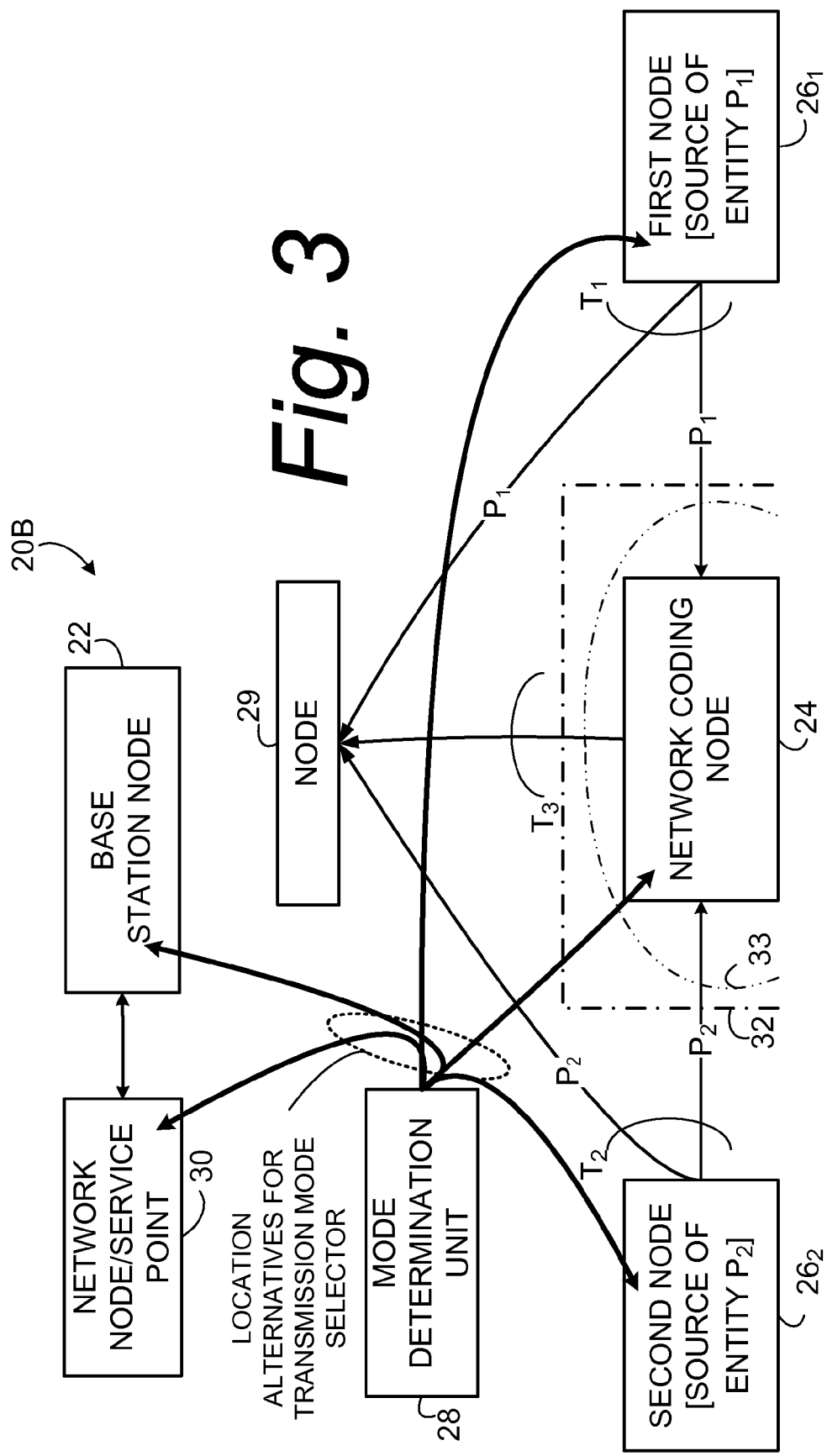
FIG. 3 is a schematic view of an example communication system having a cooperative uplink transmission topology.

FIG. 3 illustrates an example topology of wireless communication system 20B in which network coding can be performed in a cooperative uplink transmission fashion. In FIG. 3, times T1, T2, and T3 are transmission times at which first node $26_1$, second node $26_2$, and network coding node 24 are transmitting an entity. In FIG. 3, two sources (first node $26_1$ and second node $26_2$) want to send data (data d1 from first node $26_1$ and data d2 from second node $26_2$) via network coding node 24 to destination node 29.

In the cooperative uplink transmission situation and topology of FIG. 3, when the links from first node $26_1$ to network coding node 24 and second node $26_2$ to network coding node 24 are not very reliable, the network coding node 24 can be used to provide more reliable communication. In a system that does not use network coding, network coding node 24 would relay the data of first node $26_1$ and second node $26_2$ separately, i.e.: first node $26_1$ would transmit its data d1 during a first transmission, network coding node 24 would relay the data d1 of first node $26_1$ (assuming it received it correctly) to destination node 29 in a second transmission. Then second node $26_2$ would transmit its data d2 during a third transmission, network coding node 24 would relay the data of second node $26_2$ (assuming it received it correctly) to destination node 29 in a fourth transmission. When network coding is used, network coding node 24 performs network coding on the data of both first node $26_1$ and second node $26_2$ and sends the network coded data in one transmission (instead of using two transmissions to separately transmit the data of first node $26_1$ and second node $26_2$). In the network coding case, the mode determination unit 28 would make a choice on which transmission scheme to use based on the links from first node $26_1$ to network coding node 24, first node $26_1$ to destination node 29, second node $26_2$ to network coding node 24, second node $26_2$ to destination node 29, and network coding node 24 to destination node 29, or simply use a subset of these links (e.g. first node $26_1$ to network coding node 24, second node $26_2$ to destination node 29, and network coding node 24 to destination node 29) to make a decision (based on maximizing throughput, minimizing the bit-error rate of one of the users, or both, etc.).

The technology disclosed herein is applicable for all topologies, the bidirectional relay topology of FIG. 2 and the cooperative uplink transmission of FIG. 3 being just two example topologies. Another example topology is a butterfly network such as that illustrated in FIG. 1 of Wo/2009/041884, incorporated herein by reference. However, the more complex the topology, the harder it is to make the transmission mode determination a centralized decision, and a possible approach is to divide the initial complex topology into smaller sub-topologies, then applying the methods of the technology disclosed herein to these sub-topologies where different sub-topologies can have different preferred transmission modes.

For purposes of simplification, in FIG. 1 and other figures excepting FIG. 3, both first node $26_1$ and second node $26_2$ are illustrated as being end nodes, e.g., ultimate source or destination nodes for entities for which a transmission mode determination is made for operation of network coding node 24. However, it should be understood that there may be one or more intermediate nodes between the ultimate source or destination nodes, and thus first node $26_1$ and second node $26_2$ can represent such intermediate nodes in the FIG. 1 depiction. In FIG. 3, node 29 is considered an end node.

Network coding allows nodes to combine several input entities into one or plural output entities, but the number of output entities is less than the number of input entities. The throughput gain in network coding comes from the fact that the number of output entities from the network coding node which performs the combining is strictly less than the number of input entities to the network coding node. So in case there are only two input entities to the network coding node (assuming that network coding is to be preformed on these two input entities), then network coding would result in one and only one output packet.

In example illustrations described herein, two input entities are usually depicted as being applied to a network coding node, with the network coding node outputting either (1) one output entity when network coding is actually performed, or (2) two output entities (essentially the same as the input entities) when the network coding node does not perform network coding but instead implements a separate transmission mode. It should be understood that more than two input entities may be applied to a network coding node, and that in the case of network coding the mode determination unit 28 or other unit may be configured to determine the appropriate number of output entities that are to result when network coding is performed. In the case of the analog network coding (ANC) mode, the number of output entities is typically one (although it is in general determined by the number of concurrent transmissions to the network coding node). In the digital network-coded mode and the symbol level network-coded mode, the number of output entities is always less than the number of input entities. In the event of more than two input entities, in a topography such as the bidirectional relay topology of FIG. 2 it will be necessary for the nodes which receive the output entities to have access to a sufficient number of the input entities in order to perform the network decoding of the output entities generated by the network coding node. For the separate transmission mode, it will be assumed that the number of output entities always equals the number of input entities.

In whatever topology is applicable, network coding node 24 is configured to implement a determination as to which of plural transmission modes is to be a selected transmission mode for transmitting entities from network coding node 24. In the case of the analog network coding (ANC) mode, or when an end-to-end (E2E) analysis (described subsequently) is conducted, the transmission mode determination must be made before the first node and the second node transmit their entities ($P_1$ and $P_2$, respectively) toward the network coding node. The plural transmission modes include at least two of: (1) an analog network-coded mode; (2) a digital network-coded mode; (3) a symbol level network-coded mode; and (4) a separate transmission mode.

It should be understood that reference to a node such as node 24 being a "network coding node" does not necessarily require that the node always perform network coding, since the mode determination unit 28 may under some circumstances decide that the networking coding node 24 may implement the separate transmission mode. Thus, as used herein, a "network coding node" is a node which is capable of selectively implementing network coding (e.g., selecting between a network coding mode and a separate transmission mode, or between differing types of network coding modes).

In the analog network-coded (ANC) mode the plural input entities which are provided to network coding node 24 are network-combined by signal interference at a signal level at network coding node 24 into one analog network-combined output entity (depicted as entity $P_{ANC}$). In the digital network-coded mode the plural input entities (e.g., entity $P_1$—entity $P_N$) which are provided to network coding node 24 are network-combined (e.g., by a logical or otherwise reversible encoding operation) at a bit level (whether coded or uncoded bits) at network coding node 24 into one or plural digital network-combined output entities. The one or plural output entities resulting from digital network-coded mode, being less then the number of input entities, are represented as $P_{DNC}$). In the symbol level network-coded mode, network coding occurs on already-modulated symbols (e.g., symbols already in the complex/real domain) plural input entities to result in one or plural digital network-combined output entities. The one or plural output entities resulting from symbol level network-coded mode mode, being less than the number of input entities, are represented as $P_{SLNC}$. In the separate transmission mode the plural input entities (e.g., entity $P_1$ and entity $P_2$) which are provided to network coding node 24 leave network coding node 24 as respective plural uncombined output entities (e.g., essentially as entity $P_1$ and entity $P_2$).

Thus, in an example embodiment, the mode determination unit makes its transmission mode determination between at least two and possibly as many as four different transmission modes. The number of plural transmission modes that are involved in the determination depend on which modes are available and/or technically feasible at the given time of determination. It thus should be understood that the technology disclosed herein is not limited to an embodiment in which each of the four herein described modes (the analog network coding (ANC) mode, the digital network-coded (DNC), mode, the symbol level network-coded (SLNC) mode, and the separate transmission mode) are all available and eligible, as a lesser number (but a number greater than one) may exist and be encompassed hereby.

For the example scenarios described herein, in network coding (analog network coding (ANC), digital network-coding (DNC), or symbol level network-coding (SLNC)) there is one output entity for every two input entities/signals. As indicated above, there could be plural (N number of) input entities which are input to a network coding node which performs network coding. But the network coding will result in at most N-1 entities. As mentioned above, in case of analog network coding (ANC), if N number of signals are transmitted simultaneously (or actually received concurrently at the network coding node), they will result in one and only one analog network-coded signal.

FIG. 1 depicts by dashed, double-dotted line 33 the transmission of output entities from network coding node 24. As separate alternatives, and depending on the selected transmission mode, the output entities transmitted from network coding node 24 can be an analog network-combined output entity ($P_{ANC}$ in the analog network-coded mode); one or more digital network-combined output entities (represented by $P_{DNC}$); one or more symbol level network-combined entities (represented by $P_{SLNC}$); or uncombined output entities (e.g., essentially entity $P_1$ and entity $P_2$) in the separate transmission mode. To this end, FIG. 1 shows, as alternate output arrows, analog network-coded mode arrow $P_{ANC}$; digital network-coded mode arrow $P_{DNC}$; symbol level network-coded mode arrow $P_{SLNC}$; and separate transmission mode arrows $P_1$ and $P_2$. It is understood that the plural output entities transmitted from network coding node 24 emanate or radiate away from network coding node 24 in a pattern, the pattern being simplistically depicted by the dashed, double-dotted line 33.

The mode determination unit 28 makes the aforementioned determination as to which of plural transmission modes is to be a selected transmission mode for transmitting entities to one or more of the receiving nodes 26. As such, the mode determination unit 28 makes a transmission mode determination between the analog network-coded mode, the digital network-coded mode, the symbol level network-coded mode, and the separate transmission mode, or any two of these four alternative modes. In the case of the analog network coding (ANC) mode, or when an end-to-end (E2E) analysis (described subsequently) is conducted, the transmission mode determination of mode determination unit 28 must be made before first node 26₁ and second node 26₂ transmit their entities toward network coding node 24.

The mode determination unit 28 can be located in any suitable node or service point, four alternative example locations being illustrated in FIG. 1. A first example alternative location for mode determination unit 28 is at network coding node 24; a second example alternative location for mode determination unit 28 is at base station node 22; a third example alternative location for mode determination unit 28 is at another network node or service point 30; and (depending on topography) a fourth example alternative location is in one or both of the receiving nodes (e.g., first node 26₁, and second node 26₂). Such other network node or service point 30 can be connected to base station node 22 or network coding node 24 via any suitable connector, e.g., hardwire connection or wireless connection. In some embodiments it is possible to have plural mode determination units, even plural mode determination units at different locations, or to have one or more mode determination units distributed at different locations. In such embodiments, however, there must be coordination between all locations (e.g., all nodes) which host a mode determination unit or distributed portion thereof, so that a common decision can be obtained among all involved mode determination units or functionalities thereof.

The mode determination unit 28 can be located at a base station, a network coding node, or even a regular user (e.g., at first node 26₁ or second node 26₂). In case the mode determination unit 28 is a base station, it may be the node that makes the transmission mode determination as it usually holds all necessary information. In case the mode determination unit 28 is located at the network coding node, then the decision can be made at the network coding node in case it has all necessary information, or in case the missing information can be signaled without much overhead. Otherwise, the base station can make a decision and then inform the network coding node and all involved nodes about the transmission mode. In essence, any node can make the transmission mode determination provided that such node has all the necessary information. The best candidate will be the base station in general, or the network coding node in case it is the network coding node and it has the necessary information. One aspect of the technology disclosed herein involves performing the selection on the node that would minimize the need for information exchange in order to take a decision.

Figure 4:
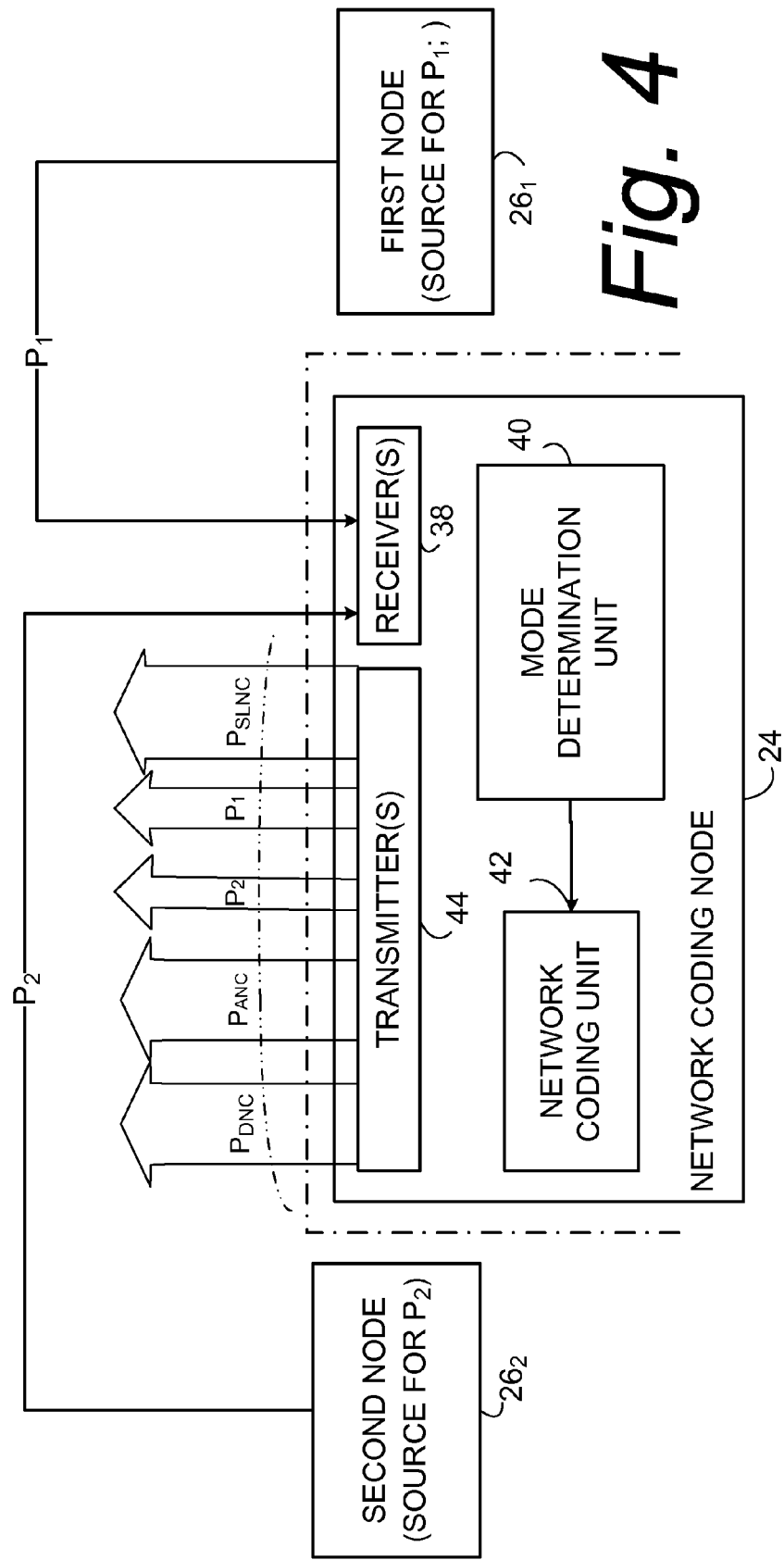
FIG. 4 is a schematic view of an example embodiment of portions of a communication system which includes a mode determination unit at a network coding node.

FIG. 4 illustrates an example embodiment wherein the mode determination unit is located at network coding node 24. In the example embodiment of FIG. 4, network coding node 24 comprises node receiver 38; mode determination unit 40; network coding unit 42; and transmitter 44. The receiver 38 is configured to receive the plural input entities over radio interface 32. The mode determination unit 40 is configured to make the determination which of plural transmission modes is to be a selected transmission mode for transmitting entities to receiving node 26. The network coding unit 42 is configured to implement the selected transmission mode in accordance with the determination with respect to the plural input entities. The transmitter 44 is configured to transmit the plural output entities either as an analog network-combined output entity ($P_{ANG}$, in the analog network-coded mode); as one or more digital network-combined output entities ($P_{DNC}$, in the digital network-coded mode); as one or more symbol-level network-combined output entities ($P_{SLNC}$, in the symbol-level network-coded mode); or as respective plural uncombined output entities (e.g., essentially as entity $P_1$ and entity $P_2$ in the separate transmission mode). As explained hereinafter, the transmitter 44 is also configured to send an indication of the selected transmission mode (e.g., a signal indicative of the selected transmission mode) to one or more other nodes.

Figure 5:
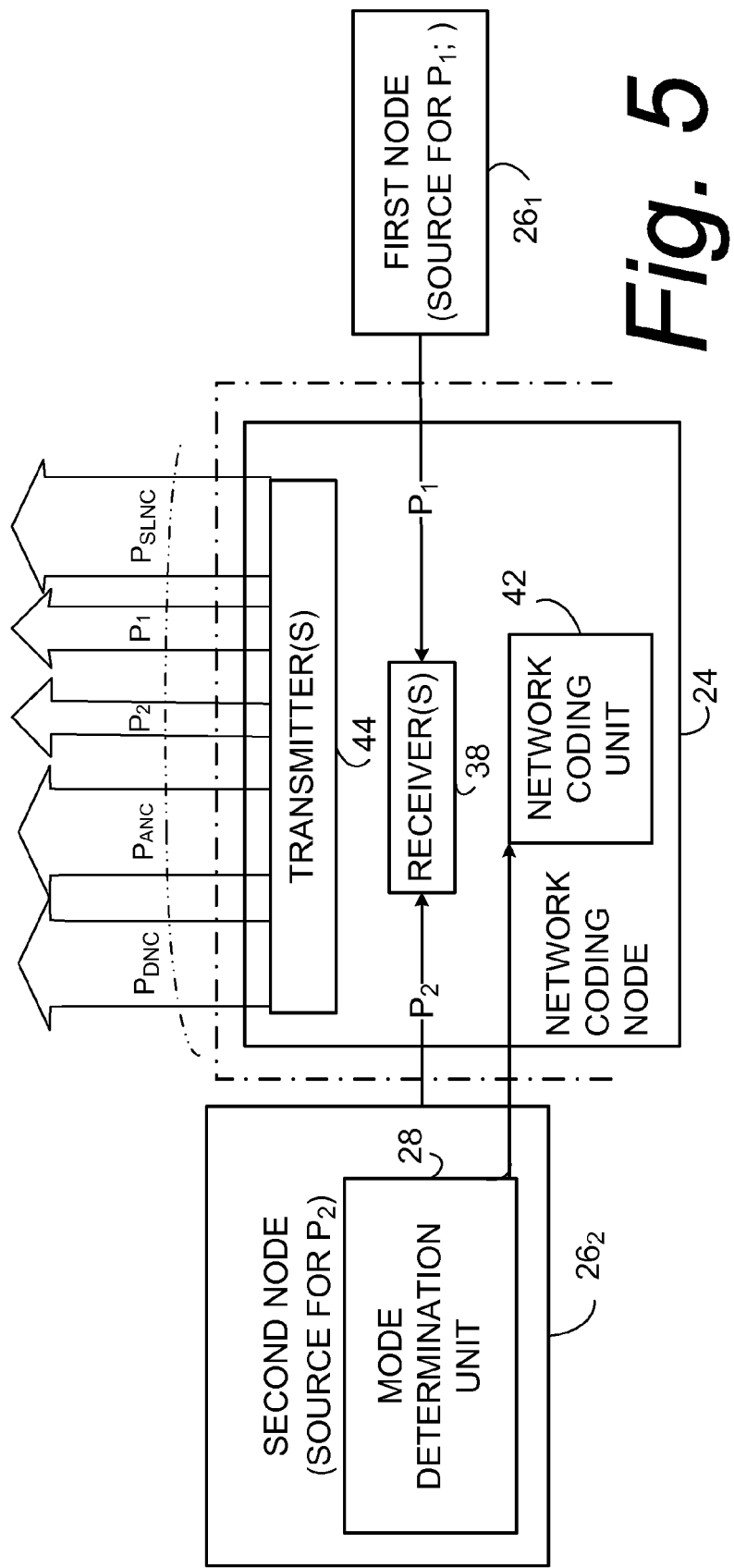
FIG. 5 is a schematic view of an example embodiment of portions of a communication system which includes a mode determination unit at a receiver node.

FIG. 5 illustrates an example embodiment wherein the mode determination unit is located at a receiver, e.g., at second node 26₂. In the example embodiment of FIG. 5, network coding node 24 comprises node receiver 38 and network coding unit 42; as well as transmitter 44. As in FIG. 4, receiver 38 is configured to receive the plural input entities over radio interface 32. But receiver 38 also receives signaling from second node 26₂ indicative of the transmission mode determination made by mode determination unit 28 now located in second node 26₂. Such indication is forwarded to network coding unit 42, which is configured to implement the selected transmission mode in accordance with the determination. The transmitter 44 is configured to transmit the plural output entities either as an analog network-combined output entity; as one or more plural digital network-combined output entities; as one or more symbol level network-coded mode entities; or as respective plural uncombined output entities. The second node 26₂ is also configured to send (through its transmitter) an indication of the selected transmission mode (e.g., a signal indicative of the selected transmission mode) to one or more other nodes.

Figure 6:
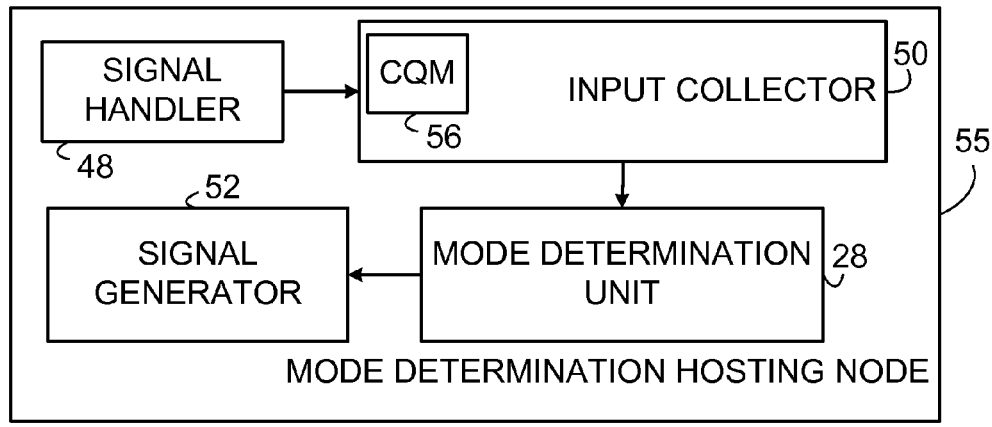
FIG. 6 is a schematic view of a generic determination-hosting node according to a first example embodiment and which makes a transmission mode determination on the basis of a performance metric.

In some example embodiments, the mode determination unit is configured to make the transmission mode determination on a basis of a performance metric. FIG. 6 shows example further details of an example node 55 which hosts a mode determination unit such as mode determination unit 28 of FIG. 1 or mode determination unit 40 of FIG. 4. FIG. 6 shows that determination-hosting node 55 further comprises signal handler 48. Information included in signaling entities received by determination-hosting node 55 which are germane to the transmission mode determination are processed and/or stored by input collector 50. The input collector 50 supplies the mode determination unit 40 with information/input upon which mode determination unit 40 can make its transmission mode determination. The determination-hosting node 55 of FIG. 6 also includes signal generator 52 (explained subsequently) which facilitates transmission of an indication of the selected transmission mode to another node (e.g., a node which transmitted at least one of the plural input entities to the network coding node, a node which receives the one or more output entities from the network coding node, the network coding node, other nodes affected by the transmission mode determination).

For example, the mode determination unit can make its transmission mode determination dependent upon evaluation of a gain function that compares performance of the plural transmission modes (e.g., of the analog network-coded mode, the digital network-coded mode, and the separate transmission mode). The gain function, which can take the form of a sum achievable rate (R) calculation, can be dependent upon a channel quality measure (CQM) as indicated by CQM values 56 shown stored in input collector 50 in FIG. 6. The channel quality measure (CQM) can include one or more of signal to noise and interference ratio (SINR), signal to noise ratio (SNR), or gain to interference and noise ratio (GINR), or other comparable channel quality measure (CQM). As used herein, the term "sum-capacity" or "sum-rate" or "sum achievable rate (R)" refers to the sum of the achievable rate of the users under question. For example, if looking at the transmission of two users that are, e.g. exchanging data, then the 'sum-capacity' is the sum of the rates that each user can achieve.

Figure 7:
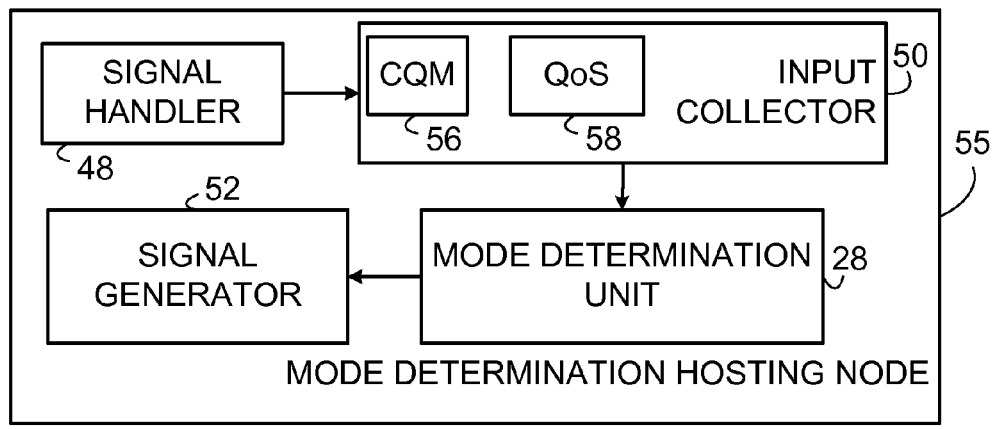
FIG. 7 is a schematic view of a generic determination-hosting node according to a second example embodiment and which makes a transmission mode determination on an additional basis of a quality of service metric.

In yet another example embodiment, illustrated in FIG. 7, the mode determination unit is configured to make its transmission mode determination not only upon a performance metric (such as CQM values 56), but also dependent upon a quality of service metric, e.g., Quality of Service (QoS) metric. Accordingly, input collector 50 is illustrated in FIG. 7 as including quality of service metric (illustrated as QoS 58 in FIG. 7). Quality of Service (QoS) metrics can include any form of QoS such as achievable data rate, jitter, packet dropping probability, interference or fairness, bit error rate (BER), delay, etc. The transmission mode is selected after computing a certain gain function based on, e.g., computing the sum-capacity of the transmission. For example, Expression (1) is a specific example using the achievable sum-rate as a cost function. Expression (1) can be combined with other QoS parameters by applying different weights on the different components, etc.

Figure 8:
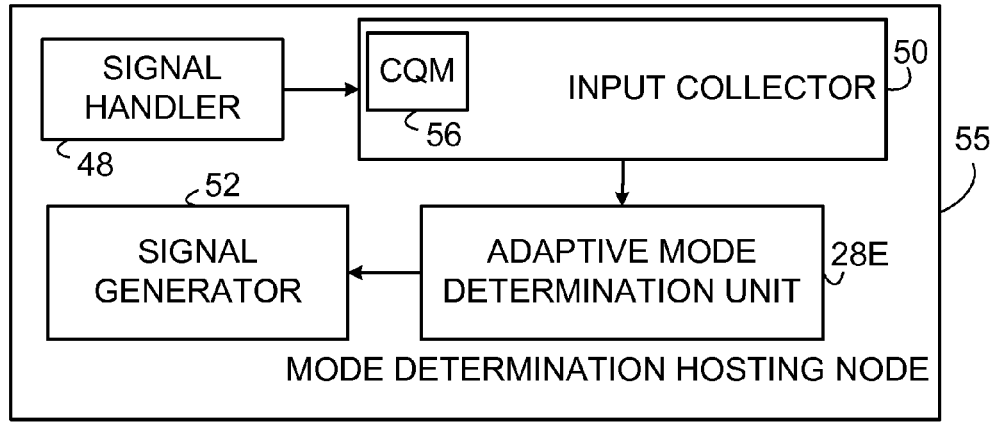
FIG. 8 is a schematic view of a generic determination-hosting node according to a second example embodiment and which makes an adaptive transmission mode determination as a performance metric changes over time.

In still another example embodiment, illustrated in FIG. 8, the mode determination unit is configured to make its transmission mode determination adaptively as the appropriate metric changes. The "appropriate metric" which can change can be the performance metric. The change of the appropriate metric can be with respect to time, frequency, or space, for example. FIG. 8 thus shows determination-hosting node 55 as comprising adaptive mode determination unit 28E.

As understood from the foregoing, the determination-hosting node 55 can be any suitable node, such as base station node 22, network coding node 24, or network node or service point 30, for example. In ensuing discussion the determination-hosting node 55 may be described as being situated at network coding node 24, but such description and example illustration is merely for convenience and is not intended to limit the location or performance of a mode determination unit which may be located elsewhere.

Figure 9:
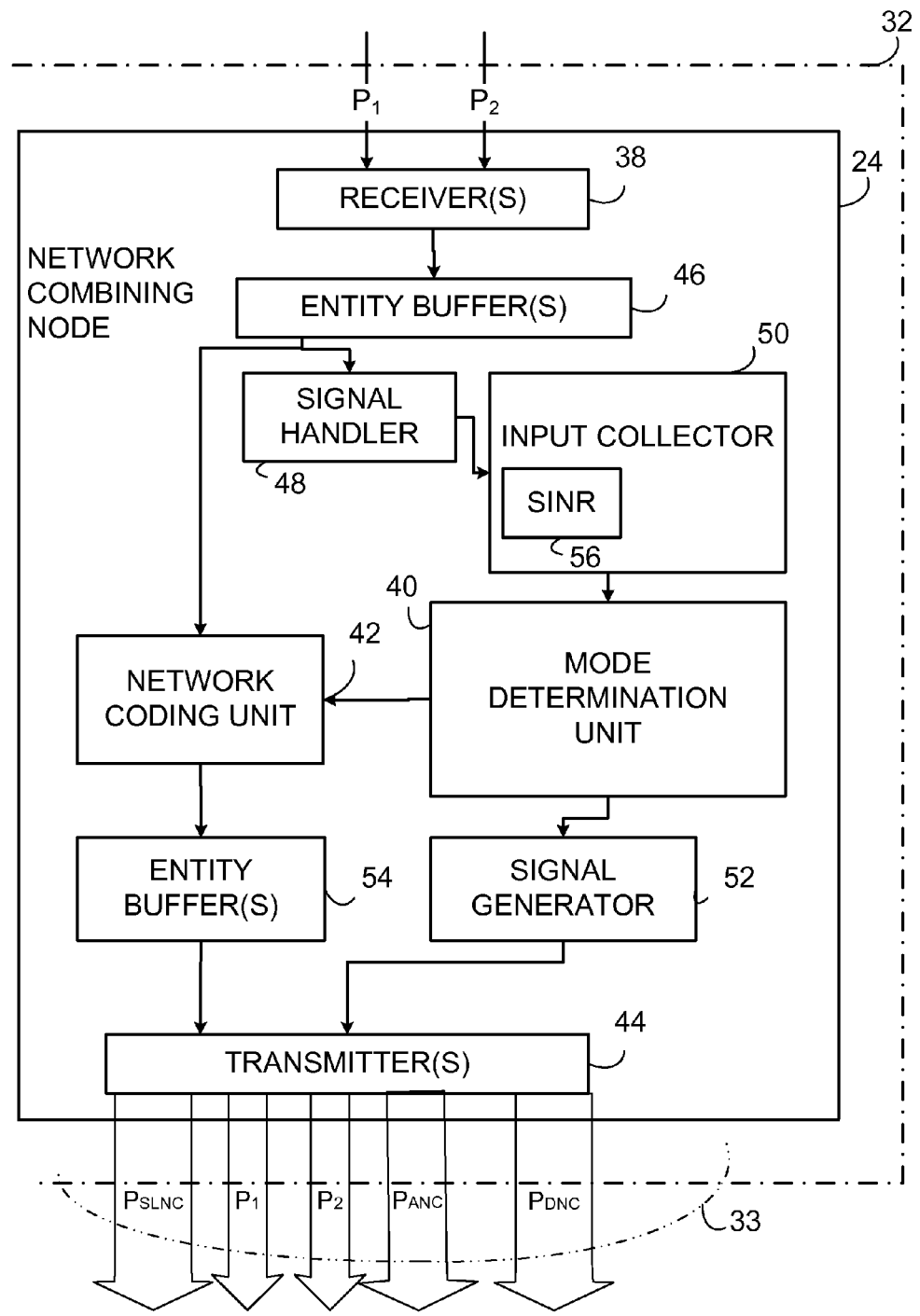
FIG. 9 is a schematic view of the example communication system of FIG. 4 and which shows an example implementation of a network coding node which includes a mode determination unit which makes a transmission mode determination on the basis of a performance metric.

FIG. 9 shows in more detail an example implementation of network coding node 24 which includes the mode determination unit 40 which makes the transmission mode determination on the basis of a performance metric. FIG. 9 shows that network coding node 24 further comprises entity buffer(s) 46 which at least temporarily store, e.g., the plural input entities (e.g., entities $P_1$ to $P_N$). In addition to storing the plural input entities, the entity buffer(s) 46 can also store other entities which bear or include signaling or other information, e.g., signaling entities. Such signaling entities are analyzed and/or handled by signal handler 48. Information included in such signaling entities which are germane to the transmission mode determination made by mode determination unit 40 are processed and/or stored by input collector 50. The input collector 50 thus supplies network coding unit 42 with information/input upon which network coding unit 42 can make its transmission mode determination. The network coding node 24 of FIG. 9 also includes signal generator 52 (explained subsequently) and entity buffer(s) 54. The entity buffer(s) 54 store the entities which either pass through network coding node 24 in the separate transmission mode or the one or plural network-combined output entities which result from the network-coded mode.

Figure 10:
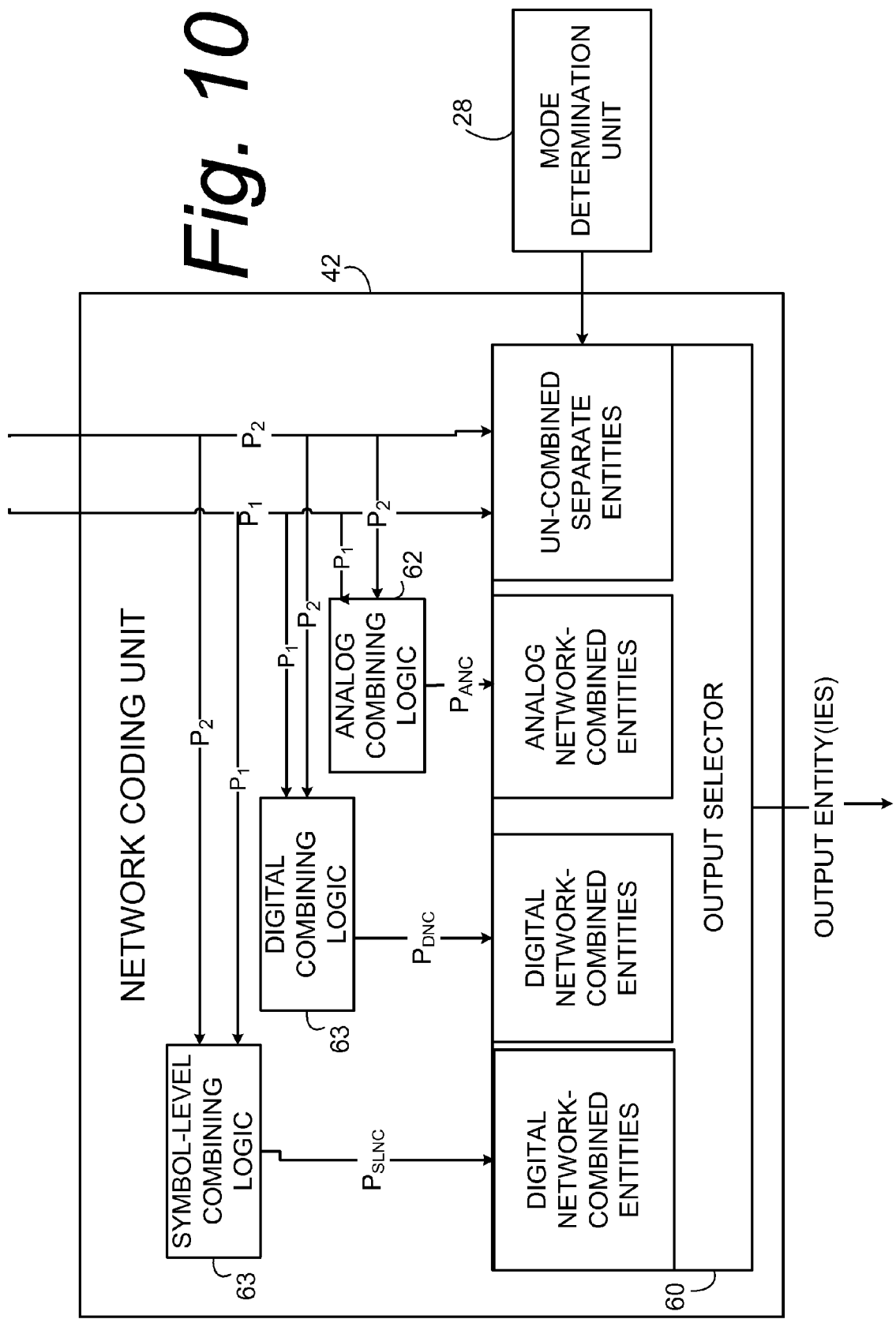
FIG. 10 is a diagrammatic view showing example, non-exhaustive and non-limiting constituent units and/or functionalities of an example network coding unit.

FIG. 10 shows example, non-exhaustive and non-limiting constituent units and/or functionalities of an example network coding unit 42. As shown in FIG. 10, network coding unit 42 comprises output selector 60 which selects the output entities to be either (1) one analog network-combined output entity ($P_{ANC}$); (2) one or plural digital network-combined output entities ($P_{DNC}$); (3) one or plural symbol-level network-combined output entities ($P_{SLNC}$); or (4) plural uncombined output entities (e.g., essentially as packet $P_1$ and packet $P_2$). As shown in FIG. 10, the plural uncombined output entities substantially pass through the network coding node 24 in the separate transmission mode. FIG. 10 further illustrates output selector 60 as being controlled by a signal from mode determination unit 28 (or mode determination unit 40 in some embodiments), as well as analog combining logic 62; digital combining logic 63; and symbol-level combining logic 64. The analog combining logic 62 performs network-coding by signal interference at a signal level. Digital combining logic 63 performs network coding (e.g., by a logical operation at a bit level (e.g., XORing)) or any type of encoding with the desired reversibility properties. Logical operation at the bit level includes bit level operations (whether coded or uncoded bits (e.g. FEC) and/or puncturing) and encompasses operations such as operations on bits (e.g., prior to any channel coding), coded bits, or codewords (e.g., after channel coding), or even modulated symbols. Encoding with desired reversibility properties encompasses, e.g., properties that make it possible that if a certain node has information A and information C=f(A,B), where f is the network coding operation, then information B can be obtained by decoding). Symbol-level combining logic 64 operates upon already-modulated symbols (e.g., symbols already in the complex/real domain). The foregoing does not imply or require that all logical operations be appropriate or usable, but that at least one logical operation or at least one reversible operation be appropriate for the network coding.

Symbol level network-coding (SLNC) is understood by the person skilled in the art, e.g., with reference to WO/2009/041884 and U.S. patent application Ser. No. 12/768,357 to Manssour filed on even date herewith, both of which are incorporated by reference herein. One can classify symbol-level network (SLNC) coding as a sub-category of either digital network coding (since encoding does not happen by concurrent transmissions) or analog network coding (since the encoding happens on modulated symbols e.g. in the baseband domain). Herein symbol level network-coded mode is classified as a sub-category of digital network-coded mode since its sum-rate equations are closer to digital network-coded mode than to analog network coding (ANC).

It should further be understood that analog combining logic 62, digital combining logic 63, and symbol-level combining logic 64 can essentially be turned off when network coding unit 42 has determined that the particular mode implemented thereby is not in effect.

Figure 11:
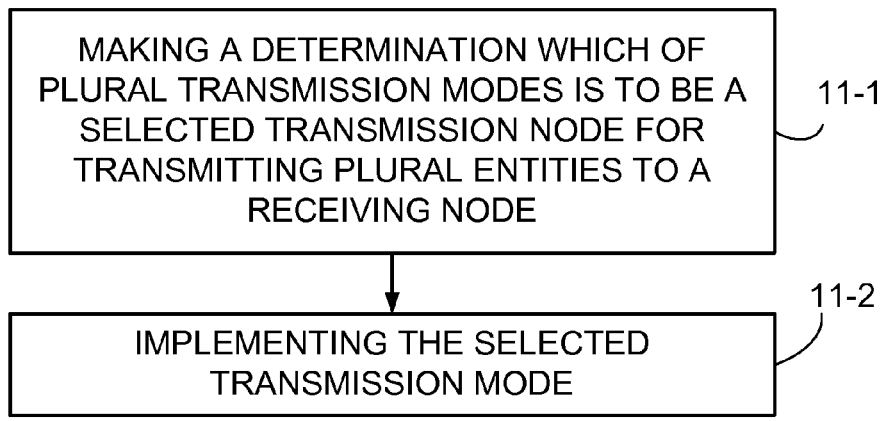
FIG. 11 is a flowchart showing basic, representative, non-limiting example acts or steps of a method of making transmission mode determination according to a basic mode.

In one of its aspects the technology disclosed herein concerns a method of operating a wireless communication system. Basic, representative, non-limiting example acts or steps of the method are illustrated in FIG. 11. The basic method of FIG. 11 comprises (as act 11-1) making a determination which of plural transmission modes is to be a selected transmission mode for transmitting plural entities to a receiving node over a radio interface, and then, in accordance with the mode determination, at the network coding node implementing the selected transmission mode with respect to the plural input entities (act 11-2). As understood from the foregoing, the plural transmission modes include at least two of: (1) the analog network-coded mode; (2) the digital network-coded mode; (3) the symbol level network-coded mode; and (4) the separate transmission mode. As indicated previously, in the case of the analog network coding (ANC) mode, or when an end-to-end (E2E) analysis is conducted, the transmission mode determination of act 11-1 must be made before first node and the second node transmit their entities toward the network coding node.

Figure 12:
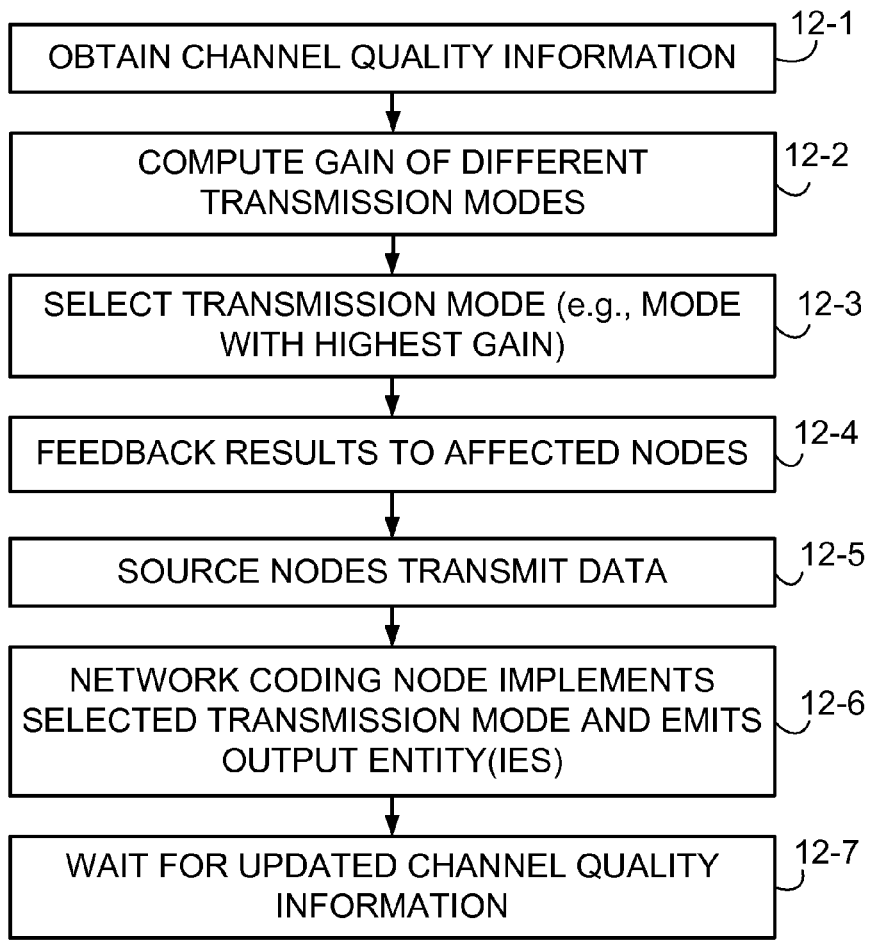
FIG. 12 is a flowcharting showing basic, representative, non-limiting example acts or steps of a method of making transmission mode determination according to another example mode.

FIG. 12 illustrates basic, representative, non-limiting and non-exhaustive example acts or steps of another mode of the basic method of FIG. 11. Act 12-2 comprises obtaining needed input, e.g., channel quality measure (CQM). Once all needed input is collected (act 12-2), as act 12-3 a gain function is computed (e.g. sum achievable rate (R)) that compares the performance of the possible transmission modes (e.g. analog network coding, digital network coding, separate transmission). As act 12-3 a decision is made as to which transmission mode to choose, the decision being based, e.g., on the evaluation of the gain function (e.g., the sum achievable rate (R)).

As act 12-4 the decision or determination result is fed back to all affected nodes (i.e., transmitting nodes, the node performing network coding, and the intended destination(s)). Feeding back of the transmission mode selection can be accomplished by signal generator 52 in the determination-hosting node 55, or more particularly by transmitter 44 in the network coding node 24 when the network coding node 24 hosts the mode determination unit 40. The indication of the selected transmission mode is sent to one or more other nodes (e.g., a transmitting node which transmitted at least one of the plural input entities to the network coding node, the network coding node 24, the receiving node 26 which receives the one or more output entities from the network coding node, or other nodes affected by the transmission mode determination). Notification of the transmission mode determination is important because, if analog network coding were chosen, the transmitting nodes have to synchronize their transmissions so as to overlap at the node performing the network coding operation. Furthermore, it is important for the destination(s) to know how to perform decoding.

After the transmission from the source nodes (depicted by act 12-5), as act 12-6 the network coding node 24 implements the selected transmission mode. Except in the case in which the selected transmission mode is the separate transmission mode, data in the input entities is network-coded at the corresponding node (e.g., network coding node 24) and consequently sent to the intended destination(s). For an adaptive mode determination unit 28E such as that shown in FIG. 8, as act 12-7 a new assessment of the transmission mode is done once one of the inputs to the gain function changes, e.g., by a certain margin. When the selected transmission mode is the separate transmission mode, the network coding node essentially allows pass through of the input entities.

Figure 13:
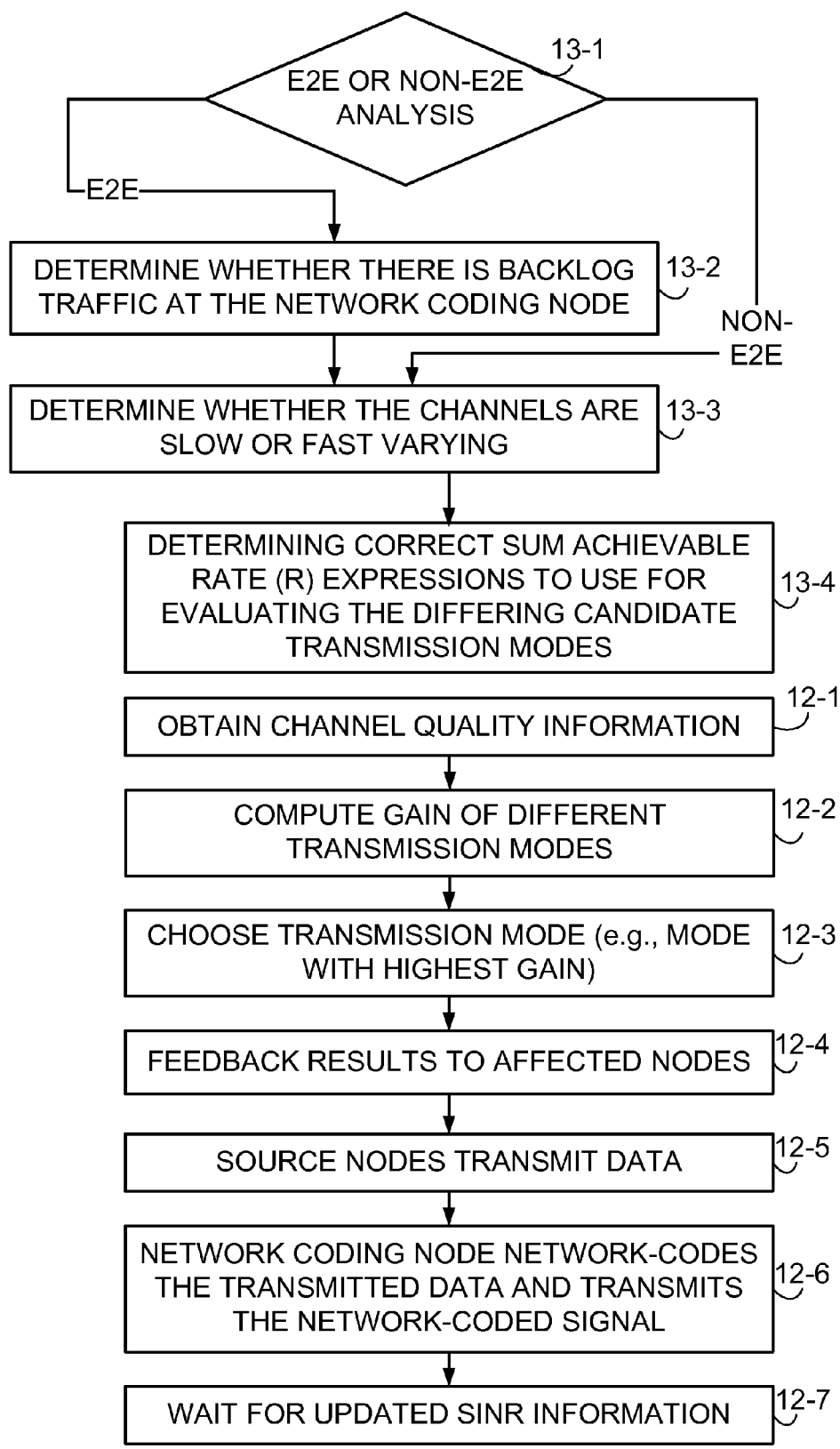
FIG. 13 is a flowcharting showing basic, representative, non-limiting example acts or steps of a method of making transmission mode determination according to YET another example mode which takes into consideration whether an end-to-end (E2E) analysis or on a non-end-to-end (non-E2E) analysis is employed.

In some example implementations, determination of the appropriate transmission mode, and thus the operation of the mode determination unit, can depend upon factors such as the type/extent of performance analysis which is involved in the determination. In such example implementations, reflected by the example method acts of FIG. 13, the network coding mode selection (NCMS) or transmission mode determination can decide on (e.g., select) a transmission mode based on either an end-to-end (E2E) analysis, or on a non-end-to-end (non-E2E) analysis. Thus, as act 13-1 of FIG. 13, the mode determination unit checks whether an end-to-end (E2E) analysis or a non-end-to-end (non-E2E) analysis is requested or applicable. In the case of an end-to-end (E2E) analysis, as act 13-2 the mode determination unit needs to know and thus determines whether there is backlog traffic at the network coding node (e.g., network coding node 24). Further, for an end-to-end (E2E) analysis (but not necessary for a non-end-to-end (non-E2E) analysis), as act 13-3 the mode determination unit 28 determines whether the channels are slow or fast varying. The concepts of end-to-end (E2E) analysis and non-end-to-end (non-E2E) analysis, backlog traffic, and channel variation are described below. The inquires and determinations of acts 13-1 through 13-3 provide information for determining in act 13-4 of FIG. 13 what are the correct sum achievable rate (R) expressions to use in act 12-3 for evaluating the differing candidate transmission modes, e.g., the analog network-coded mode, the digital network-coded mode, the symbol level network-coded mode, and the separate transmission mode. After act 13-4, the remainder of the method of FIG. 13 includes acts which are essentially similar to those of FIG. 12. Accordingly, acts 12-1 through 12-7 of FIG. 13 are understood with respect to the preceding discussion of FIG. 12, which is not now repeated.

As mentioned above, there can be two different types of extents of analysis, the end-to-end (E2E) analysis and the non-end-to-end (non-E2E) analysis. FIG. 14 and FIG. 15 serve to contrast the E2E analysis and the non-E2E in context of an example network topography and scenario which serves as a non-exhaustive illustration of these two types of analysis. The scenario of both FIG. 14 and FIG. 15 is that of a case of bidirectional relaying, i.e. two end-nodes (or end-users) such as first node $26_1$ and second node $26_2$ that want to exchange information through a third relaying node, e.g., network coding node 24. An E2E analysis as illustrated in FIG. 14 chooses the transmission mode by taking into account, e.g., the following two factors: (1) the transmissions from the end-nodes towards the relaying node; and (2) the transmission from the relaying node towards the end-users. On the other hand, a non-E2E analysis as illustrated in FIG. 15 chooses the transmission mode by taking into account only the transmission from the relaying node towards the end-users.

Thus, in an implementation in which the transmission mode determination or network coding mode selection (NCMS) involves evaluation of a channel quality measure (CQM)-dependent gain function or the calculation of the sum achievable rate (R), the determination or selection can be dependent upon whether an end-to-end (E2E) analysis or a non-end-to-end (non-E2E) analysis is employed. The following discussion explains how a sum achievable rate (R) can be obtained for each of the plural transmission modes (e.g., the analog network-coded mode, the digital network-coded mode, and the separate transmission mode) in accordance with whether an end-to-end (E2E) analysis or a non-end-to-end (non-E2E) analysis is employed, and particularly for a bidirectional relaying topography such as that of FIG. 2. In other words, the following discussion explains what expressions can be employed for the sum achievable rate (R)

depending on the factors such as analysis type (E2E or non-E2E), backlog traffic, and channel varying rate for a bidirectional relaying topography. The person skilled in the art will understand from the ensuing discussion and examples how to obtain the sum achievable rate (R) for other topographies.

In conjunction with the ensuing discussion of example sum achievable rate (R) expressions, it should be remembered that, by definition, analog network coding (ANC) occurs when two end-nodes transmit in such a way that their transmissions are simultaneously received, and consequently added, by the channel at the relaying node (e.g., network coding node 24). The relaying node then amplifies the combined received signal and transmits it. This means that ANC might be a possible candidate only in case of an E2E analysis. By contrast, digital network coding (DNC), symbol level network-coding (SLNC), and separate transmission (ST) can be chosen in both an E2E analysis and a non-E2E analysis.

End-To-End (E2E) Analysis

For discussing the E2E analysis, very simplified equations are utilized herein as examples to measure the sum-rate (e.g., sum achievable rate (R)) as the sole performance criterion. The sum-rate is more tangible to quantify with some simplified equations, and looking at the case of two end-users only (the same analysis is straightforward to apply for more).

E2E Analysis: Analog Network-Coded Mode

As described earlier for analog network coding (ANC), the two users transmit such that their signals are received and added simultaneously at the relaying node as Expression (5):

$$y_R = h_{1,r} s_1 + h_{2,r} s_2 + n_r \quad \text{Expression (5):}$$

In Expression (5), $h_{i,r}$ is the channel from end-user i to the relay and $n_t$ is the noise at the relay. The relay then amplifies this signal with an amplification factor β (under a certain transmit power constraint) and transmits it. End-user 1 then receives the signal depicted by Expression (6). A similar equation can be written for end-user 2.

$$y_1 = \beta h_{r,1} y_R + n_1 \quad \text{Expression (6):}$$

Similarly, one can write the equation of the signal received at end-user 2. Each of these two signals is then used to compute a signal to interference and noise ratio (SINR) $\Gamma_1^{ANC}$ and $\Gamma_2^{ANC}$. These SINR values will then determine the amount of information transmitted to each of the end-nodes.

One possible way to quantify the rate is to use the Shannon capacity formula of Expression (7).

$$C_i = \log_2(1 + \Gamma_i^{ANC}) \quad \text{Expression (7):}$$

In Expression (7), $C_i$ is the capacity at end-user 'i' for i=1,2 (of course in practice a lower rate is achieved due to the finite modulation and coding used; however, the above formula serves as a good illustrating example). In the remainder of the discussion, the achievable rate is calculated by using the Shannon capacity formula.

By summing both $C_i$, one can obtain the initial sum-rate of Expression (8).

$$S = C_1 + C_2. \quad \text{Expression (8):}$$

A more correct measure to use in case of analog network coding (ANC) is the sum-rate of Expression (9).

$$R = \alpha C_1 + \gamma C_2, \quad \text{Expression (9):}$$

In Expression (9), α and γ are factors between 0 and 1 which are used to account for non-synchronization of the reception at the relaying node (e.g. network coding node) of the two transmitted signals. In case of perfect synchronization, the synchronization factor is equal to 1, and in case of complete non-synchronization, this factor is equal to 0. The synchronization or non-synchronization can be measured as how delayed of the agreed time the signal of a certain user reached the network coding node. As a result, each user will have a different synchronization factor. Consequently, the equation of the sum-rate for the case of analog network coding (ANC) can be written as Expression (10).

$$R_{ANC} = \frac{1}{2}[\alpha \log_2(1 + \Gamma_1^{ANC}) + \gamma \log_2(1 + \Gamma_2^{ANC})] \quad \text{Expression (10)}$$

Note the ½ factor used which is used to account for the number of resources used in order to complete the data exchange. For example, in case of a time-division based system, two transmission slots (over a given frequency) are needed to complete the data exchange.

The following parameters should be considered when evaluating the performance of analog network coding (ANC): (1) the channel qualities from each of the end-users towards the relaying node; (2) the noise level at the relaying node (in case of low channel qualities from the end-users towards the relaying node, and/or high noise level at the relaying node, ANC's performance would degrade due to noise amplification); (3) the channel qualities from the relaying node towards the end-users; (4) the possibility to synchronize reception of the signals coming from the end-users at the receiver; and, (5) the number of transmissions required to complete the whole data exchange.

E2E Analysis: Symbol-Level Network-Coded Mode

The transmissions from the end-users to the network coding node (e.g., network coding node 24) are exactly the same for both DNC and SLNC. The difference is in the transmission from the network coding node to the destinations. Unlike digital network-coded mode, symbol level network-coded mode is not constrained by the weakest link (as explained in U.S. patent application Ser. No. 12/768,357 to Manssour filed on even date herewith). In symbol level network-coding the encoding occurs on already modulated symbols, so one can select the modulation and coding scheme (MCS) or modulation to satisfy the links from the network coding node to the destinations on a link-by-link basis, not with respect to the weakest link. Hence the sum-rate equations of Expression (11) and Expression (12) would respectively apply depending on the backlog and fast fading (essentially the same reasoning for the expression as above explained for the digital network-coded mode).

$$R_{SLNC}^{E2E}(\text{backlog}) = \frac{1}{3}[\log_2(1 + \Gamma_1^{DL}) + \log_2(1 + \Gamma_2^{DL})] \quad \text{Expression (11)}$$

$$R_{SLNC}^{E2E}(\text{non-backlog}) = \frac{1}{3}[\log_2(1 + \min(\Gamma_2^{DL}; \Gamma_2^{UL}; \Gamma_1^{UL})) + \log_2(1 + \min(\Gamma_2^{UL}; \Gamma_1^{DL}; \Gamma_1^{UL}))] \quad \text{Expression (12)}$$

The only difference is that the min operator is not necessary for the downlink channels (i.e. from the network coding node to the destinations) since the network-coded signal can now consist with signals having different MCS prior to network coding. However, for the case of no backlog, the min operator is still needed for the uplink channels' sake.

E2E Analysis: Digital Network-Coded Mode

In the digital network-coded mode (DNC), the two end-users transmit their signals on separate resources, either in time or in frequency. Unlike analog network coding (ANC), the transmission of the end-users are not supposed to interfere, i.e. add-up, by the channel. It is assumed that the relay is able to decode both transmissions, otherwise, digital network-coded mode operation is not possible.

In case that the channel is slow fading (i.e. the channel does not change from the instant the end-users transmit their data to the instant the end-users receive the relaying node's transmission) or in case that the relay has a backlog of data to both end-users (i.e., the relay has enough data to send to both end-users, probably from previous transmissions e.g. in case the relaying node waits until it receives several transmissions from both end-users before it starts transmitting), the analysis can be simplified by only considering the transmission from the relay towards both end-users by discarding the transmission from the end-users towards the relay. Since the relay node is transmitting the same network-coded signal to both end-users, and as the channel quality from the relaying node towards these end-users is typically different, then the modulation and coding scheme (MCS) should be chosen so that the weaker user is able to correctly decode. Equation-wise, this is written as Expression (13).

$$R_{DNC}^{E2E}(\text{backlog}) = \frac{1}{3}[\log_2(1 + \min(\Gamma_1^{DL}; \Gamma_2^{DL})) + \log_2(1 + \min(\Gamma_1^{DL}; \Gamma_2^{DL}))]$$

Expression (13)

In Expression (13) $\Gamma_1^{DL}$ and $\Gamma_2^{DL}$ are the SINRs of the channels from the relaying node to end-user 1 and end-user 2, respectively. It is important to know that $\Gamma_1^{DL}$ and $\Gamma_2^{DL}$ for the digital network-coded (DNC) mode are different from the ones computed for the case of analog network coding (ANC). Notice the min operator that is used to guarantee that the modulation and coding scheme (MCS) is chosen so that the weakest end-user is able to correctly decode.

The factor ⅓ of Expression (13) is used to account for the number of resources used in order to complete the data exchange. For example, in case of a time-division based system, three transmission slots (over a given frequency) are needed to complete the data exchange.

In case there is no backlog traffic at the relaying node, and if the channels are very fast fading, a more general equation of the sum-rate can be written as Expression (14).

$$R_{DNC}^{E2E}(\text{non-backlog}) = \frac{1}{3}[\log_2(1 + \min(\Gamma_2^{DL}; \Gamma_2^{UL}; \Gamma_1^{DL}; \Gamma_1^{UL})) + \log_2(1 + \min(\Gamma_2^{DL}; \Gamma_2^{UL}; \Gamma_1^{DL}; \Gamma_1^{UL}))]$$

Expression (14)

The min operator of Expression (14) is to ensure two things: (1) that both end-users are able to decode the relaying node's transmission (modeled by the SINRs containing the DL part); and (2) that the relaying node is not transferring more data than it has received (since it has no backlog traffic to transmit) (modeled by the SINRs containing the UL part).

The list of parameters to check when evaluating the performance of DNC includes, but is not limited to: (1) the channel qualities from each of the end-users towards the relaying node and the consequent amount of decoded data (in case of correct decoding) from each end-user; (2) the channel qualities from the relaying node towards the end-users; (3) the number of transmissions required to complete the whole data exchange; (4) presence/absence of backlog traffic; and (5) slow/fast fading of the channel (can be inferred by comparing points 1 and 2 above).

E2E Analysis: Separate Transmission (ST) Mode

In the separate transmission (ST) mode, the transmissions occur independently of each other. The first end-user will transmit and the relaying node will receive (e.g. after decoding). Then the relaying node will forward this data to the second end-user. The same procedure is repeated when the second end-user transmits. For the separate transmission (ST) mode the following SINRs are defined:

$\Gamma_{i,UL}$: the SINR from end-user 'i' to the relaying node $\Gamma_{i,DL}$: the SINR from the relaying node to end-user 'i'

These are the same SINRs that were used for the case of digital network-coded mode. Consequently, the sum-rate or sum achievable rate (R) can be written as Expression (15).

$$R_{ST}^{E2E}(\text{non-backlog}) = \frac{1}{4}[\log(1 + \min(\Gamma_{1,UL}; \Gamma_{2,DL})) + \log(1 + \min(\Gamma_{2,UL}; \Gamma_{1,DL}))]$$

Expression (15)

The min operator is only used for Expression (15) in case there is no backlog traffic. This is used to model the following case: if the link from end-user 'i' to the relaying node is weak, and the link from the relaying node to end-user 'j' is strong, the relay can not transmit data to end-user 'j' with a rate relative to its quality because it did not receive that much data from end-user 'i'. In other words, if end-user 1 was able to transmit only 2 bits per symbol to the relaying node (assume QPSK, and the transmission is allocated only one symbol to transmit), and even though the link from the relaying node to end-user 2 can support a transmission of 6 bits per symbol (i.e. 64 QAM), the relaying node does not have 6 bits to deliver to end-user 2, but only 2 bits. However, in case the relaying node has backlog traffic destined to end-user 2 from previous transmissions, then this limitation is overcome and the sum-rate equation can be written as Expression (16).

$$R_{ST}^{E2E}(\text{backlog}) = \frac{1}{4}\log(1 + \Gamma_{2,DL}) + \log(1 + \Gamma_{1,DL})$$

Expression (16)

The list of parameters to check when evaluating the performance of separate transmission (ST) mode includes, but is not limited to: (1) the channel qualities from each of the end-users towards the relaying node and the consequent amount of decoded data (in case of correct decoding) from each end-user; (2) the channel qualities from the relaying node towards the end-users; (3) the number of transmissions required to complete the whole data exchange; (4) presence/absence of backlog traffic.

The factor ¼ of Expression (16) is used to account for the number of resources used in order to complete the data exchange. For example, in case of a time-division based system, four transmission slots (over a given frequency) are needed to complete the data exchange.

Non-E2E Analysis: Digital Network-Coded Mode

The non-end-to-end (non-E2E) analysis of the digital network-coded mode involves only transmission from the relaying node towards the end-users. The sum-rate or sum achievable rate (R) is obtained as Expression (17).

$$R_{DNC}^{nonE2E} = \log_2(1 + \min(\Gamma_2^{DL}; \Gamma_1^{DL})) + \log_2(1 + \min(\Gamma_2^{DL}; \Gamma_1^{DL}))$$ Expression (17)

Note that only one transmission over a certain frequency is required to perform digital network-coded mode in this case.

Non-E2E Analysis: Symbol-Level Network-Coded Mode

The case for the non-end-to-end (non-E2E) analysis for the symbol level network-coded mode is essentially the same as for digital network-coded mode, where only the equation of sum-rate is different and provided by Expression (18), where the min operators have been removed.

$$R_{SLNC}^{nonE2E} = \log_2(1+\Gamma_1^{DL}) + \log_2(1+\Gamma_2^{DL})$$ Expression (18):

The performance of the symbol level network-coded mode is typically better than that of digital network-coded mode. Yet the digital network-coded mode remains as a viable option for several reasons. A first reason is that digital network-coded mode has historical precedence, it is reasonable that a certain system may start by implementing digital network-coded mode before having a SLNC possibility. A second reason is that the SLNC feature may be turned off for some reason, or it is used by the network provider as a licensed feature (i.e. the operator needs to pay extra to obtain this feature, unlike the others that might be already present or the operator simply does not want to implement this feature): so in short, it could be the presence or absence of this (or any other) feature.

Non-E2E Analysis: Separate Transmission Mode

The sum-rate equation for the separate transmission mode for the non-end-to-end (non-E2E) analysis is given by Expression (19).

$$R_{ST}^{nonE2E} = \frac{1}{2}[\log_2(1+\Gamma_1^{DL}) + \log_2(1+\Gamma_2^{DL})]$$ Expression (19)

For the separate transmission mode non-end-to-end (non-E2E) analysis two transmissions are needed.

Figure 16:
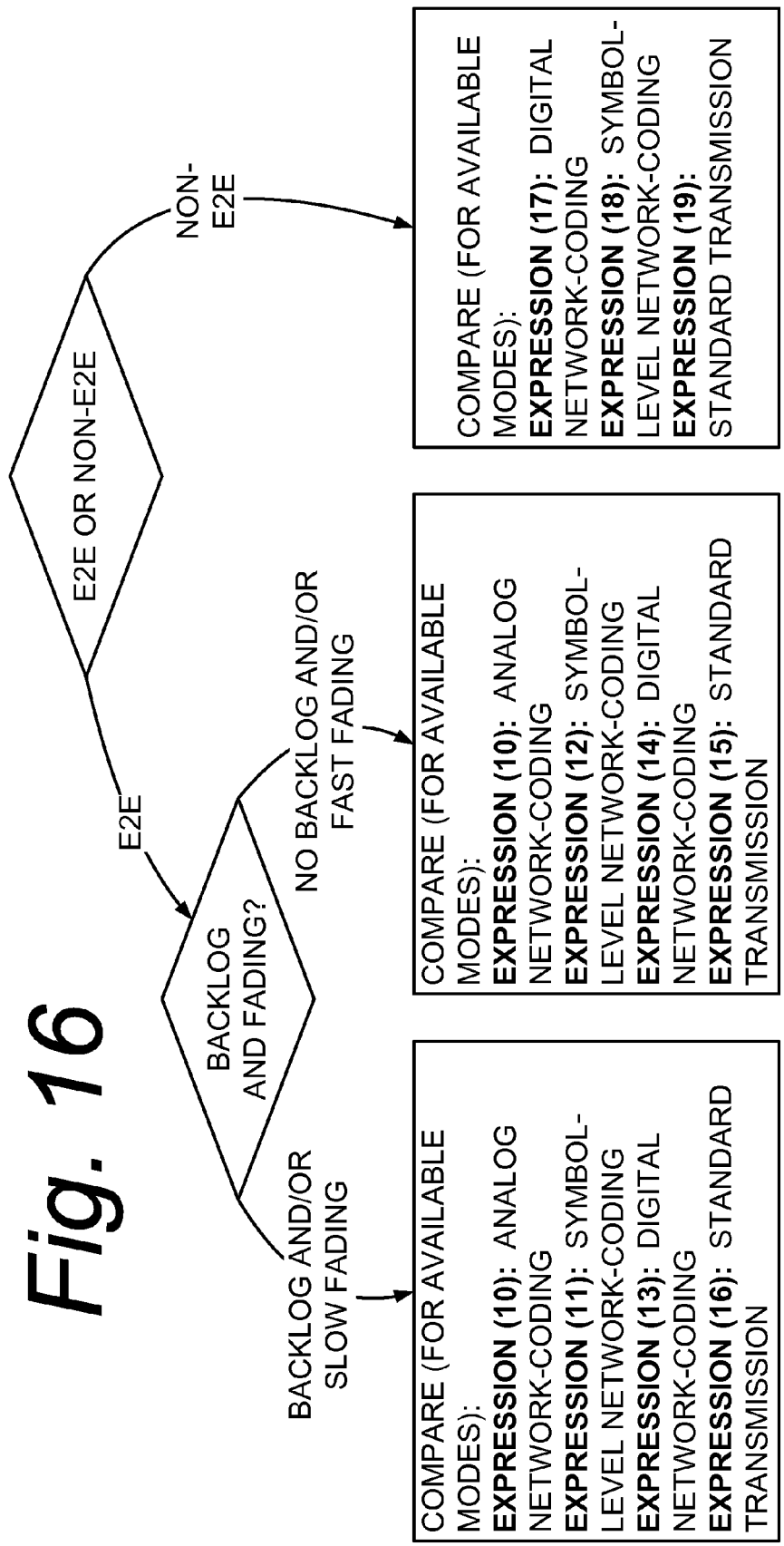
FIG. 16 is a diagrammatic view illustrating which expression for sum achievable rate (R) is correct depending on such factors as whether end-to-end (E2E) analysis or non-end-to-end (non-E2E) analysis is employed, whether there is backlog traffic, and whether the channel is slow or fast varying.

Thus, as explained with reference to FIG. 13, the mode determination unit first checks (as act 13-1) if there is an E2E or a non-E2E analysis. In case of an E2E analysis, the mode determination unit 28 needs to know if we have backlog traffic at the relay (act 13-2) or if the channels are slow or fast varying (act 13-3) in order to use the correct sum-rate formula. FIG. 16 illustrates the correct expression for the sum-rate or sum achievable rate (R) depending on such factors as whether end-to-end (E2E) analysis or non-end-to-end (non-E2E) analysis is employed, whether there is backlog traffic, and whether the channel is slow or fast varying. After determining the correct formulas (act 13-4), and computing them (act 12-2), the algorithm chooses the transmission mode that would provide the highest sum-rate (act 12-3).

As indicated previously, when evaluating the differing transmission modes (e.g., in the manner of FIG. 16), it should be understood that all modes may not be available for selection due to various reasons, such as technical reasons or the reason of non-existence/non-installation of a particular mode. For example, in a given situation not all of the analog network coding (ANC), the digital network-coded mode, and the symbol level network-coded mode may be available. In such situation, the mode determination unit makes its transmission mode determination from the modes that are available.

Thus, the technology disclosed herein includes a method and apparatus for communicating information between two or more network nodes so as to adaptively select a suitable transmission mode based on at least one transmission parameter. Since there is no guarantee that performing network coding leads to a better system performance, or which network coding mode is more beneficial than the other under specific channel conditions, it is beneficial to control the transmission mode to be used based on one or more desired performance metrics as described and illustrated in the examples above. The method can be executed at any network node so as to minimize the amount of overhead required to obtain all information data needed to make a choice on the transmission mode to be used.

The technology disclosed herein can be implemented, e.g., using suitably configured electronic circuitry at the node performing the transmission mode determination and/or the network coding operation (e.g., network coding node, base station, or simply any other network node) or at the base station (even if it was not the node performing the network coding operation) in case it readily has all the input needed to make a decision, hence reducing the amount of signaling required to make the necessary input information available at the node where the algorithm is to be run.

Figure 17:
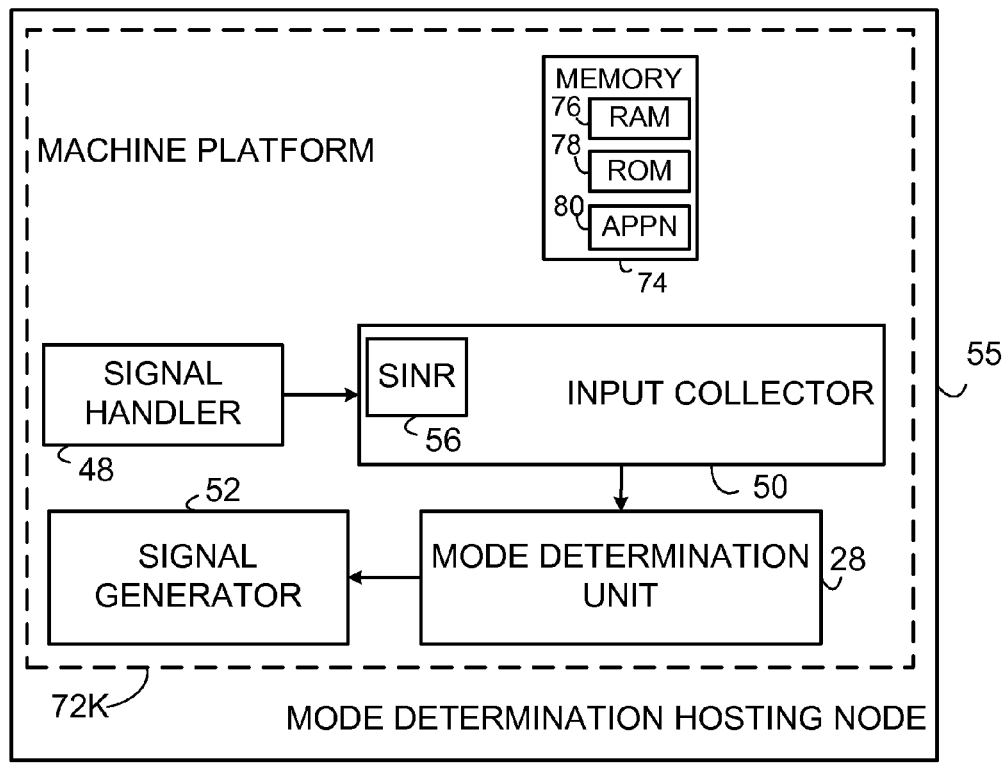
FIG. 17 is a schematic view of an example determination-hosting node, and particularly shows a machine platform upon which a mode determination unit can be realized or provided.

As shown in FIG. 17, various functional units of determination-hosting node 55 of any of the embodiment described herein or encompassed hereby can be provided on machine platform 72K which is framed by broken lines in FIG. 17. The terminology "platform" is a way of describing how various functional units of determination-hosting node 55 can be implemented or realized by machine One example platform 72K is a computer implementation wherein one or more of the framed elements, including but not limited to mode determination unit 28 are realized by one or more processors which execute coded instructions in order to perform the various acts described herein, including acts involved in the method of FIG. 10. In such a computer implementation the determination-hosting node 55 can comprise, in addition to a processor(s), memory section 74 (which in turn can comprise random access memory 76; read only memory 78; application memory 80 (which stores, e.g., coded instructions which can be executed by the processor to perform acts described herein); and any other memory such as cache memory, for example). Another example implementation of a machine platform suitable for determination-hosting node 55, or for implementation of mode determination unit 28 and network coding unit 42 in any location or node, is that of a hardware circuit, e.g., an application specific integrated circuit (ASIC) wherein circuit elements are structured and operated to perform the various acts described herein.

Figure 18:
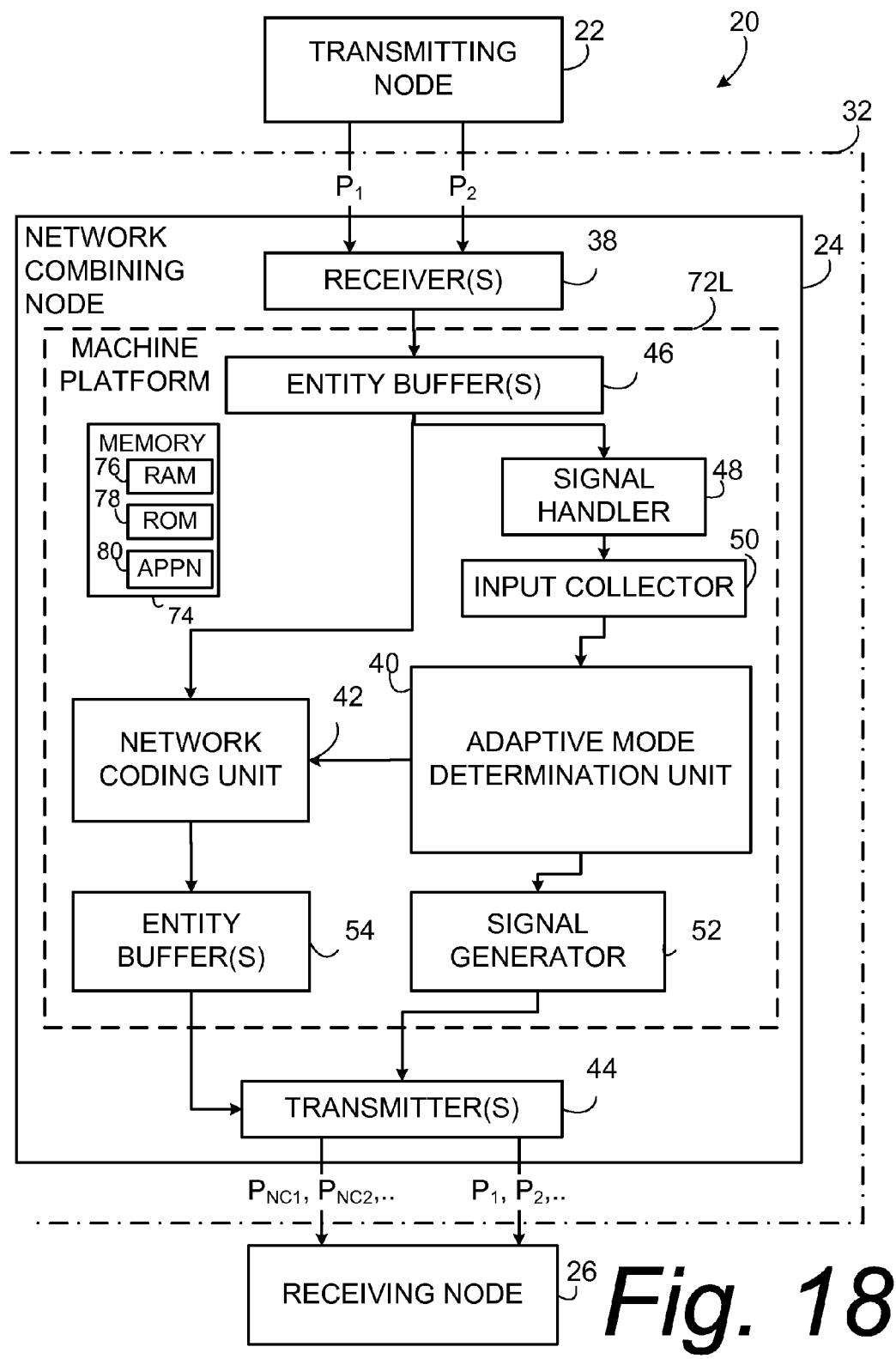
FIG. 18 is a schematic view of an example communication system which includes yet another example of a network coding node, and particularly shows a machine platform upon which a mode determination unit and a network coding unit can be realized or provided.

FIG. 18 similarly shows that various functional units of network coding node 24 of any of the embodiment described herein or encompassed hereby can be provided on machine platform 72L which is framed by broken lines in FIG. 18. The terminology "machine platform" is a way of describing how various functional units of network coding node 24 can be implemented or realized by machine One example platform 72L is a computer implementation wherein one or more of the framed elements, including but not limited to mode determination unit 40 and network coding unit 42 are realized by one or more processors which execute coded instructions in order to perform the various acts described herein, including acts involved in the method of FIG. 10. In such a computer implementation the network coding node 24 can comprise, in addition to a processor(s), memory section 74 (which in turn can comprise random access memory 76; read only memory 78; application memory 80 (which stores, e.g., coded instructions which can be executed by the processor to perform acts described herein); and any other memory such as cache memory, for example). Another example platform suitable for network coding node 24, or for implementation of mode determination unit 40 and network coding unit 42 in any location or node, is that of a hardware circuit, e.g., an application specific integrated circuit (ASIC) wherein circuit elements are structured and operated to perform the various acts described herein.

Figure 19:
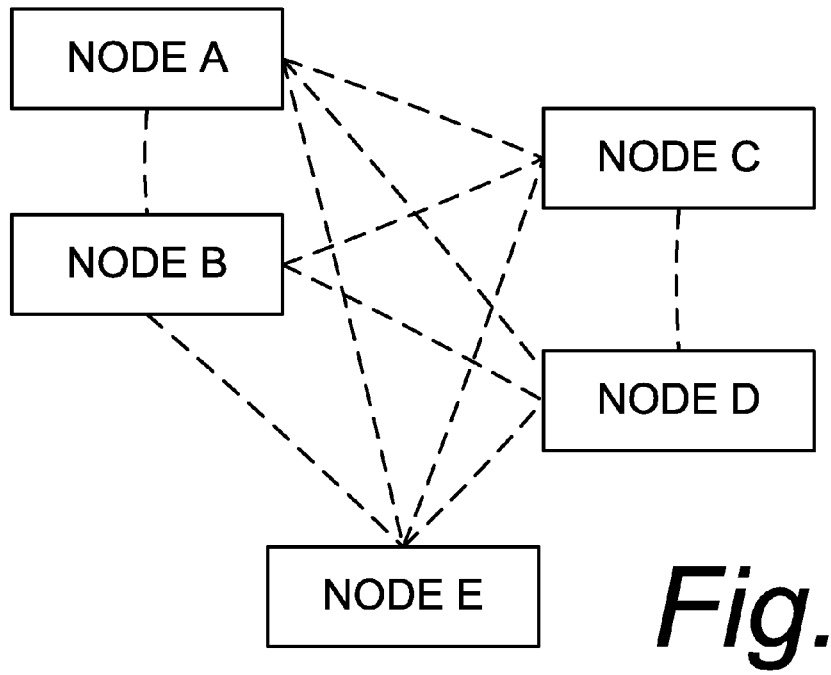
FIG. 19 is a schematic view of an example of a network of nodes.

FIG. 19 shows an example of a network of nodes, and thus illustrates that the network configuration is not limited to that illustrated, e.g., in FIG. 1 or other drawings.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a wireless communication system comprising:
    making a determination which of plural transmission modes is to be a selected transmission mode for transmitting plural entities from a network coding node over a radio interface, the plural transmission modes including at least two of the following:
        (1) an analog network-coded mode wherein plural input entities provided to the network coding node are network-combined by signal interference at a signal level at the network coding node into one analog network-combined output entity;
        (2) a digital network-coded mode wherein the plural input entities provided to the network coding node are network-combined by operation at a bit level at the network coding node into one or plural digital network-combined output entities; and
        (3) a symbol-level network-coded mode wherein the plural input entities are already modulated and network-coding is performed on the already-modulated plural input entities to provide one or plural symbol-level network-combined output entities;
    making the determination by selecting, for each candidate transmission mode, an appropriate expression for sum achievable rate to evaluate; and comparing a resulting evaluation for each selected expression with an evaluation of an expression of a competing candidate transmission mode, and wherein the selecting depends on factors including whether and end-to-end (E2E) analysis or non-end-to-end (non-E2E) analysis is utilized;
    at the network coding node, in accordance with the determination implementing the selected transmission mode with respect to the plural input entities.

2. The method of claim 1, further comprising making the determination on a basis of a performance metric.

3. The method of claim 2, further comprising adaptively making the determination as the performance metric changes.

4. The method of claim 1, wherein the determination is dependent upon evaluation of a gain function that compares performance of the plural transmission modes.

5. The method of claim 4, wherein the gain function is dependent upon a channel quality measure (CQM).

6. The method of claim 5, wherein the determination is also dependent upon a quality of service metric.

7. The method of claim 1, further comprising selecting the appropriate expression depending on backlog traffic and/or whether channels are slow or fast fading.

8. The method of claim 1, further comprising making the determination at the network coding node.

9. The method of claim 1, further comprising:
    making the transmission mode determination at a first node or service point; and
    sending an indication of the selected transmission mode to another node.

10. The method of claim 1, wherein the plural transmission modes includes: (4) a separate transmission mode wherein the plural input packets provided to the network coding node leave the network coding node as respective plural uncombined output packets.

11. The method of claim 1, wherein in mode (3) the symbols are already in the complex/real domain.

12. A wireless communication system comprising:
    a first node configured to generate a first node entity;
    a second node configured to generate a second node entity;
    a network coding node configured to receive over a radio interface plural input entities including the first node entity and the second node entity;
    a mode determination unit configured to make a determination which of plural transmission modes is to be a selected transmission mode for transmitting output entities from the network coding node over the radio interface, the plural transmission modes including at least two of the following:
        (1) an analog network-coded mode wherein the plural input entities provided to the network coding node are network-combined by signal interference at a signal level into one analog network-combined output entity;
        (2) a digital network-coded mode wherein the plural input entities provided to the network coding node are network-combined by operation at a bit level at the network coding node into one or plural digital network-combined output entities; and
        (3) a symbol-level network-coded mode wherein the plural input entities are already modulated and network-coding is performed on the already-modulated plural input entities to provide one or plural symbol-level network-combined output entities;
    wherein the mode determination unit is configured to make the determination by selecting, for each candidate transmission mode, an appropriate expression for sum achievable rate to evaluate; and comparing a resulting evaluation for each selected expression with an evaluation of an expression of a competing candidate transmission mode, and wherein the selection depends on factors including whether an end-to-end (E2E) analysis or non-end-to-end (non-E2E) analysis is utilized
wherein the network coding node is configured to implement the transmission mode determination of the mode determination unit.

13. The wireless communication system of claim 12, wherein the plural transmission modes includes: (4) a separate transmission mode wherein the plural input packets provided to the network coding node leave the network coding node as respective plural uncombined output packets.

14. The wireless communication system of claim 12, wherein in mode (3) the symbols are already in the complex/real domain.

15. A mode determination unit configured to make a determination which of plural transmission modes is to be a selected transmission mode for transmitting one or more output packets from a network coding node over a radio interface, the plural transmission modes including at least two of the following:
   (1) an analog network-coded mode wherein plural input signals provided to a network coding node are network-combined by signal interference at a signal level at the network coding node into one analog network-combined output entity;
   (2) a digital network-coded mode wherein the plural input entities provided to the network coding node are network-combined by operation at a bit level at the network coding node into one digital network-combined output entities; and
   (3) a symbol level network-coded mode wherein the plural input entities are already modulated and network coding is performed on the already modulated plural input entities to provide one or plural symbol-level network-combined output entities; and
   wherein the mode determination unit is configured to make the determination by selecting, for each candidate transmission mode, an appropriate expression for sum achievable rate to evaluate; and comparing a resulting evaluation for each selected expression with an evaluation of and expression of a competing candidate transmission mode, and wherein the selection depends on factors including whether and end-to-end (E2E) analysis or non-end-to-end (non-E2E) analysis is utilized.

16. A network coding node of a wireless communication system comprising:
   a receiver configured to receive the plural input entities over the radio interface
   a mode determination unit configured to make a determination which of plural transmission modes is to be a selected transmission mode for transmitting output entities over the radio interface, the plural transmission modes including at least two of the following:
   (1) an analog network-coded mode wherein plural input signals provided to the network coding node are network-combined by signal interference at a signal level at the network coding node into one analog network-combined output entity;
   (2) a digital network-coded mode wherein the plural input entities provided to the network coding node are network-combined by operation at a bit level at the network coding node into one or plural digital network-combined output entities; and
   (3) a symbol-level network-coded mode wherein the plural input entities are already modulated and network-coding is performed on the already-modulated plural input entities to provide one or plural symbol-level network-combined output entities; and
   wherein the mode determination unit is configured to make the determination by selecting, for each candidate transmission mode, an appropriate expression for sum achievable rate to evaluate; and comparing a resulting evaluation for each selected expression with an evaluation of and expression of a competing candidate transmission mode, and wherein the selection depends on factors including whether and end-to-end (E2E) analysis or non-end-to-end (non-E2E) analysis is utilized;
   a network coding unit configured to implement the selected transmission mode in accordance with the determination with respect to the plural input entities; and
   a transmitter configured to transmit entities either one analog network-combined output entity in the analog network-coded mode, one or plural digital network-combined output entities in the digital network-coded mode; or one or plural symbol-level network-combined output entities in the symbol-level network-coded mode.

17. The mode determination unit of claim 15 or the network coding node claim 16, further comprising a transmitter configured to send an indication of the selected transmission mode to another node.

18. A mode determination unit of claim 15, wherein the plural transmission modes includes: (4) a separate transmission mode wherein the plural input packets provided to the network coding node leave the network coding node as respective plural uncombined output packets.

19. A mode determination unit of claim 15, wherein in mode (3) the symbols are already in the complex/real domain.

20. The apparatus of wireless communication system claim 12, the mode determination unit of claim 15, or the network coding node claim 16, wherein the mode determination unit is configured to select the appropriate expression depending on backlog traffic and/or whether channels are slow or fast fading.

21. The wireless communication system of claim 12, the mode determination unit of claim 15, or the network coding node claim 16, wherein the mode determination unit is configured to make the determination on a basis of a performance metric.

22. The wireless communication system, the mode determination unit of, or the network coding node of claim 21, wherein the mode determination unit is configured to adaptively make the determination as the performance metric changes.

23. The wireless communication system, the mode determination unit, or the network coding node of claim 21, wherein the determination is dependent upon evaluation of a gain function that compares performance of the plural transmission modes.

24. The wireless communication system, the mode determination unit, or the network coding node of claim 23, wherein the gain function is dependent upon signal to a channel quality measure (CQM).

25. The wireless communication system, the mode determination unit, or the network coding node of claim 24, wherein the mode determination unit is configured to make the determination also dependent upon a quality of service metric.

26. The network coding mode of claim 16, wherein the plural transmission modes includes: (4) a separate transmission mode wherein the plural input packets provided to the network coding node leave the network coding node as respective plural uncombined output packets.

27. The network coding mode of claim 16, wherein in mode (3) the symbols are already in the complex/real domain.

* * * * *

UNITED STATES PATENT AND TRADEMARK OFFICE
CERTIFICATE OF CORRECTION

PATENT NO. : 8,553,598 B2
APPLICATION NO. : 12/768397
DATED : October 8, 2013
INVENTOR(S) : Manssour It is certified that error appears in the above-identified patent and that said Letters Patent is hereby corrected as shown below:

In the Specification

In Column 3, Line 32, delete "modes" and insert -- modes. --, therefor.

In Column 9, Line 28, delete "preformed" and insert -- performed --, therefor.

In Column 10, Line 26, delete "less then" and insert -- less than --, therefor.

In Column 10, Line 32, delete "mode mode," and insert -- mode, --, therefor.

In Column 22, Line 31, delete "machine" and insert -- machine. --, therefor.

In Column 22, Line 57, delete "machine" and insert -- machine. --, therefor.

In the Claims

In Column 24, Line 2, in Claim 1, delete "and end-to-end" and insert -- an end-to-end --, therefor.

In Column 25, Line 43, in Claim 15, delete "and expression" and insert -- an expression --, therefor.

In Column 25, Line 45, in Claim 15, delete "and end-to-end" and insert -- an end-to-end --, therefor.

In Column 26, Line 9, in Claim 16, delete "and expression" and insert -- an expression --, therefor.

In Column 26, Line 11, in Claim 16, delete "and end-to-end" and insert -- an end-to-end --, therefor.

In Column 26, Line 23, in Claim 17, delete "node claim 16," and insert -- node of claim 16, --, therefor.

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,553,598 B2

In Column 26, Line 33, in Claim 20, delete "system claim" and insert -- system of claim --, therefor.

In Column 26, Line 35, in Claim 20, delete "node claim 16," and insert -- node of claim 16,--, therefor.

In Column 26, Line 41, in Claim 21, delete "node claim 16," and insert -- node of claim 16,--, therefor.